United States Patent Office 3,423,358
Patented Jan. 21, 1969

---

3,423,358
VINYLIC FILLER PIGMENTS
Oliver W. Burke, Jr., Fort Lauderdale, Fla.
(P.O. Box 1266, Pompano Beach, Fla. 33061)
No Drawing. Original application Oct. 15, 1954, Ser. No. 462,611, now Patent No. 3,190,850, dated June 22, 1965. Divided and this application June 22, 1965, Ser. No. 466,098
The portion of the term of the patent subsequent to June 22, 1982, has been disclaimed and dedicated to the Public
U.S. Cl. 260—41     5 Claims
Int. Cl. C08f 47/06

This application is a division of parent application Ser. No. 462,611, filed Oct. 15, 1954, now Patent No. 3,190,- 850, issued June 22, 1965, filed pursuant to a requirement for restriction entered in said parent application.

This invention relates to pigments and aims generally to provide new pigment products herein called vinylic filler pigments or vinylic pigments, particularly but not exclusively those having reinforcing as well as coloring properties, and to methods of producing the same.

GENERAL OBJECTS

In the present state of the art it is known that a certain limited number of water soluble and dispersible dyes can be crystallized, can form metallic salts, can combine with an inorganic substrate to form lakes, or in some cases can be ground to powders, in which cases these colored materials are used as pigments. However, the great majority of dyes do not form satisfactory pigments.

It is an object of this invention to make available pigments, composed of particles in the colloidal range, from all classes of water soluble or dispersible dyes or dye components, including numerous water soluble or dispersible dyes never before used in forming pigments. It is obvious that by making available in pigment form additional dyes and additional types of dyes, the art of printing colors on papers and on fabrics and the coloring of elastic, plastic materials in fiber, film, or mass forms will be greatly benefited.

It is a further object of the invention to produce new pigments in highly useful particle size, herein termed vinylic pigments, by combining with vinylic fillers, as herein defined, water soluble or dispersible dyes or dye components or the leuco form of dyes, with organic or inorganic substrates present or absent.

It is a further object of this invention to make available pigments from vinylic fillers and graft vinylic fillers which have been pigmented with inorganic compounds.

It is a further object of the invention to produce vinylic pigment products of such fine colloidal size that the same are suitable for incorporation in the melt solutions, solvent solutions or latices from which artificial fibres, films and objects are formed, for coloring, or reinforcing and coloring the same; and it is a still further object of the invention to provide fibres, films, and objects colored, or colored and reinforced, by such vinylic filler pigments.

Many dyestuffs are expensive, and because this invention provides an economical colloidal core which is surfaced with the more expensive color material, a more economical pigment is produced; the preparation of vinylic pigments from azoic colors exemplifies the formation of more economical pigments from expensive dyestuffs.

Another object and advantage of the invention is to form new combinations of both white and colored inorganic pigments with the vinylic pigments.

Other objects and advantages of the invention in general and in particular forms will be apparent from the following detailed description of illustrative embodiments thereof.

This invention resides in the vinylic pigment, in methods of producing the same, in combinations of inorganic pigments and organic pigments with the vinylic pigments, and in products containing the same, hereinafter exemplified, and is more particularly defined in the appended claims.

The term "vinylic fillers" herein designates the homopolymerization and the multi-polymerization products, in colloidal size particles, obtained from polymerizable substances containing one or more polymerizable unsaturated linkages, more specifically, from monomers containing a single vinyl or allyl group or plurality of, or combination of vinyl and allyl groups, and combinations of such monomers with or without other polymerizable unsaturated compounds provided at least one of the monomers is a cross-linking agent and the colloidal polymerization products therefrom are cross-linked to a condition of insolubility.

Representative monomeric cross-linking agents containing the vinyl group are divinylbenzene and N,N-methylene-bisacrylamide; examples of allyl-containing cross-linking agents are triallylcyanurate and N,N-diallylmelamine; an example of combined vinyl-allyl is allylacrylate, a representative cross-linking agent containing the vinylidene group is ethyleneglycoldimethacrylate; allylmethacrylate represents a combination of the allyl-vinylidene groups; and an example of a cross-linking agent containing the vinyl-vinylidene groups is the mixed ester prepared from ethyleneglycol and acrylic and methacrylic acids.

Modes of preparing these cross-linked colloidal sized vinylic filler particles and various characteristics thereof, including the characteristics of polarity and reactivity associated with carboxylic type vinylic and graft vinylic fillers, and the reinforced elastic and plastic materials prepared therewith, are disclosed in my copending patent application, Ser. No. 378,735, filed Sept. 8, 1953, now abandoned, entitled, "Vinylic Fillers and the Reinforcement of Elastic and Plastic Materials Therewith" and are further described in my U.S. application, Ser. No. 538,- 728, filed Oct. 5, 1955, entitled, "Graft Vinylic Fillers and Their Uses," now abandoned.

In the aforementioned copending patent application I have shown that vinylic fillers can be prepared in several different manners to yield particles which will reinforce natural rubber, synthetic elastic materials, plastic materials, protective and decorative coatings, and further that grafted vinylic filler particles will also reinforce the aforementioned materials when such are graft formed from polymeric emulsifiers, or when such are seeded elastomers and plastomers which will alone form films and solid masses of high strength and resistance to deformation.

By the present invention such vinylic type filler particles may be converted to colors, and such invention is based on my discovery that vinylic fillers, because of their colloidal size, insolubility, and organic surfaces and configurations, are capable of physical or chemical bonding of water soluble or dispersible dyestuffs, leuco dyestuffs and dyestuff components. For these purposes the vinylic fillers may be prepared as disclosed in the aforementioned copending applications, that is, by emulsion polymerization of vinyl monomers and cross-linking same to insolubility, in such a manner that colloidal particles are formed with proper surface configurations and/or active chemical groups.

I have further discovered that such vinylic filler particles can be converted to vinylic pigments by making a water solution or dispersion of the dyestuff and/or leuco derivative of the dyestuff, or the dyestuff components, and adding such solution or dispersion to the vinylic filler latex, or to reconstituted vinylic filler latex, or to a slurry prepared by agitating dry vinylic filler with water, and finally evaporating the mixture to (1) cause the dyestuff to separate from the water dispersion or dispersion and to deposit on the vinylic filler particles, or to (2) cause the leuco form of the dyestuff to oxidize and deposit on the vinylic filler particles, or to (3) cause the dyestuff components to react and deposit on the vinylic filler particles, thus forming the vinylic pigment which may be filtered and washed and dried or used as a wet color pulp without drying or may be flushed with an organic vehicle or film-forming material to form a flush color, or may be combined with other white or colored pigments either in dry, flushed or water-slurried form and used as such.

The methods by which dyestuffs are fixed to vinylic and graft-vinylic fillers according to this invention are probably of the following five different types:

(1) By adsorption a type of Van der Waals bonding in which certain soluble or dispersion dyestuffs are bonded on vinylic fillers due to the high affinity of certain dyestuffs for vinylic fillers as a result of the surface configuration or high surface energy of such colloidal particles. Thus, direct dyestuffs for cellulose acetate can be absorbed on the surfcae of a styrene-divinylbenzene vinylic filler grafted with methylmethacrylate. Hydrogen bonding between the dyestuff and the vinylic filler may in this case also contribute to the formation of the vinylic pigment.

(2) By ionic bonding between the dyestuff and the vinylic filler. Thus, the vinylic pigment formed by a basic dyestuff and an acidic vinylic filler is probably due to ionic bonding. In like manner the formation of heavy metal salts of dyestuffs and/or vinylic type fillers is also attributed to ionic bonding.

(3) By coupling the dyestuff to the vinylic filler by a complex metal bond. Thus, for example metal mordant dyestuffs are so combined with basic vinylic type fillers to form vinylic pigments which are believed fixed by a van der Waals type bonding.

(4) By the isolubility of a dyestuff formed by coupling soluble components of such dyestuff in the presence of vinylic filler particles, as for example the formation of an insoluble azoic dyestuff on the surface of vinylic filler particles thereby building a vinylic pigment. Further, a soluble dye can be converted to the insoluble form in the presence of vinylic filler particles, thus forming the vinylic pigment. An example of this is the dioxidation of the leuco form of a vat or sulfur dyestuff in the presence of vinylic filler particles. Again such insoluble dyestuffs are probably fixed to the vinylic type filler by a type of Van der Waals force.

(5) By chemical or atomic bonding of the dyestuff to the vinylic filler particles, thus forming vinlic pigments. Thus dyestuffs with amine groups capable of reacting with an aldehyde group can be chemically combined with vinylic filler particles having aldehyde groups on their surfaces. For example basic dyestuffs or direct and devolpment dyestuffs capable of reacting with aldehyde groups can be fixed on a styrene-methacrolein-divinylbenzene vinylic filler thus forming a vinylic pigment with the dyestuff fixed thereon.

The terms, ionic bond, atomnic bond and Van der Waals bond are used in the same sense as used in J. A. A. Ketelaar book entitled, "Chemical Constitution," published in 1953 by Elsevier Publishing Company, Amsterdam, Netherlands.

Numerous examples of these five methods of fixing dyestuffs on vinlic and graf vinlic fillers to form vinylic pigments are given hereinafter.

Table I is illustrative of typical recipes that can be used in preparing vinylic fillers which will combine with dyestuffs to form the vinylic pigments of this invention.

(I) PREPARATION OF VINYLIC TYPE FILLERS

Vinylic type filler latices are prepared according to polymerization recipes of which the following represents typical limits for a vinylic filler:

Monomer and or mixtures thereof (containing
 cross-linking agent) _____ 100.
Water _____ 100 to 350.
Emulsifying agents _____ 0 to 20.
Polymerization catalysts (peroxide, redox,
 etc.) _____ 0.02 to 2.0.
Latex from previous step (see limits above).
Monomer and or mixtures thereof _____ 0 to 100.
Water _____ 0 to 350.
Emulsifying agent _____ 0 to 20.
Polymerization catalyst _____ 0 to 2.2.0

If methanol or other antifreeze solution in water is used in place of water in the recipes shown above then subzero polymerization temperatures can be used or if a pressure vessel is provided the temperature can be raised to the range of 150° C. to 250° C. or to a critical upper temperature at which emulsions are no longer stable. It is convenient, however, to use 40° to 100° C. or above and a polymerization time of 8 to 16 hours where vinyl monomers are principally concerned and 80° C.–150° C. where allyl monomers principally are concerned.

It is of course understood that vinylic fillers are formed by either single step or multi-step polymerization. Thus, multi-polymer vinylic fillers can be formed from hydrophobic polymers, or from hydrophilic polymers (e.g., vinylic fillers from polymeric emulsifiers) by a cross-linking polymerization step.

It is understood that graft vinylic fillers are formed by grafting onto previously found vinylic fillers, either non-cross-linked or cross-linked elastomers, plastomers, or condensation products and such grafts when themselves of non-cross-linking materials are usually in amounts equal to or less than the amount of vinylic core material present.

Vinylic fillers and graft vinlyic filler latices can be prepared from numerous monomers as for example those set forth in Tables I and II hereafter, and in a similar maner many other monomers, used in the polymerization art, can be combined into vinylic and graft vinylic fillers. The monomers available to one skilled in the art are noted in the folowing books on polymerization:

"Styrene, Its Polymers, Copolymers and Derivatives" by
 R. H. Boundy and R. F. Boyer, 1952, Reinhold Publishing Corporation, New York, N.Y.
"Principles of Polymer Chemistry" by Paul J. Flory, 1953,
 Cornell University Press, Ithaca, N.Y.
"Polymerisationkinetik" by L. Kuechler, 1951, Springer-Verlag, Heidelberg, Germany
Volume I, "Einstoffpolymerisation"; Volume II, "Mehrstoffpolymerisation" by Franz Krczil, 1941, Akademische-Verlag, Leipzig, Germany
Polyvinylchlorid und Vinylchlorid-Mischpolymerisate by
 Franz Kainer (1951), Springer-Verlag, Heidelberg, Germany The following list indicates some of the monomers available from the above literature sources and from the patent art which, if properly employed as taught herein and in my copending applications, can be used to form vinylic and graft vinylic fillers. These monomers include: monovinyl aromatic compounds such as styrene, the methyl styrenes, the ethyl styrenes, the dimethyl styrenes, the diethyl styrenes, the isopropyl styrenes, the mixed alkyl styrenes; nuclear-substituted vinyl aryl compounds where the substitution is alkyl, aryl alkaryl, aralkyl, cycloalkyl, alkoxy, aryloxy, chloro, fluoro, chloromethyl, fluoromethyl and trifluoromethyl nuclear derivatives; halogenated derivatives of these various aromatic vinyl compounds such as the mono- and dichloro styrenes, the alkyl substituted mono- and dichloro styrenes; the vinyl naphthalenes, methyl vinyl naphthalene and their halogenated derivatives vinyl aryl acids and vinyl alkyl acids such as acrylic acid, and the alpha-alkyl substituted acrylic acid such as methacrylic acid, and esters of such acids as glycidyl, methyl, ethyl, propyl, butyl, isobutyl and other esters of aliphatic alcohols; the amides of acrylic and methacrylic acids and derivatives thereof such as the methacrylamides, acrylamides, N-methylacrylamides, N, N-diethylacrylamide, N-ethylmethacrylamide, N,N-dimethylmethacrylamide, etc.; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethylchloromaleate; the unsaturated ketones, methyl vinyl ketone and methyl isopropyl ketone; the vinyl pyridines; the vinyl quinolines; vinyl furans; vinyl carbazoles; the esters of vinyl alcohols such as vinyl acetate; acylamino substituted acrylic and methacrylic acids, and their esters, methyl-, ethyl-, propyl- and the like such as α-acetaminoacrylate and the α-n-butyraminoacrylates, etc.; the ethers of olefinic alcohols, especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; the allyl and vinyl nitrogen ring compounds such as triallylcyanurate; copolymerizable alkenyl chlorides including methally chloride, allyl chloride, vinylchloride, vinylidene chloride, 1-chloro-1-fluoroethylene and 4-chlorobutene-1; and the vinylidenes; further, polyvinyl, polyallyl and vinylallyl compounds which cause cross-linking such as polyvinyl aromatic compounds, for example divinylbenezene, divinyltoluene, divinylxylene, divinylethylbenzene, trivinylbenzene, divinylnaphthalene, divinylmethylnaphthalenes; the vinyl esters, allyl esters and vinyl allyl esters of carboxylic and polycarboxylic acids including polymerizable ester monomers such as diallyl maleate, vinylcrotonate, allyl methacrylate, allyl acrylate, ethylene glycol dimethacrylate, divinyl succinate, divinyladipate, vinylacrylate, vinylmethacrylate; the aliphatic acetylenes such as vinylacetylene, alphamethyl vinylacetylene, and the arylacetylenes such as phenylacetylene.

In preparing graft vinylic fillers butadiene, isoprene, piperylene, methyl pentadiene and other hydrocarbon dienes are useful and also the polar dienes such as chloroprene and cyanobutadiene can effectively be used.

In Tables I and II polymerization recipes are given, however, such recipes are employed to teach methods of formation of the vinylic and graft vinylic fillers which are thereafter converted to vinylic pigments. The polymerization methods are not to be restrictive and it will be appreciated by one skilled in the polymerization art, from the books on polymerization heretofore cited and from the patent polymerization art that there are many variations in the polymerization recipes which can be used to finally produce vinylic pigments.

For many uses it is desirable not to have an emulsifier present with the vinylic pigment, however, for other uses this is unimportant.

If an emulsifier is employed it can be a soap of fatty acids such as soap of tallow, a soap of hydrogenated tallow, or a soap of hydrogenated or dihydrogenated rosin, alkyl aryl sulfonates (Santomerse-3) alkyl sulfates, mineral acid salts of long chain amines (dodecylamine hydrochloride), polymeric emulsifiers of the type exemplified in my U.S. application, Ser. No. 378,735, protein materials (α-protein) and the like. Methacrylic acid as well as other acidic monomers can be emulsified with Santomerse-3 (sodium salt of dodecylbenzenesulfonic acid); therefore, this emulsifier was chosen to prepare a great number of the examples of graft vinylic fillers given herein, whether the systems were acid, neutral or alkaline.

In selecting a polymerization catalyst for the vinylic and graft vinylic fillers used to produce the vinylic pigments, the choice between a water and oil soluble catalyst depends upon the water solubility of the monomers being polymerized which will be understood by one skilled in the art. Water soluble catalysts for the polymerization are such compounds as potassium persulfate, ammonium persulfate, sodium perborate, sodium perchlorate and hydrogen peroxide and such are used with and without small amounts of heavy metal salts such as those of iron, cobalt, etc., with or without reducing agent such as sodium sulfite, etc. The catalyst used may be an azo compound like azobis-(isobutylronitrile) or it may be a peroxide such as benzoyl peroxide, acetyl peroxide, phthaloyl peroxide, or it may be a hydroperoxide such as cumene hydroperoxide, or diisopropylbenzene hydroperoxide which is often used with a reducing agent, such as tetraethylene pentamine, and ferrous sulfate as a source or iron, and sodium or potassium pyrophosphate to complex the iron. The combination of an organic hydroperoxide, ferrous iron and a reducing agent is known as a "redox" system. Many such systems are known and used to promote polymerization and can be used to prepare vinylic pigments. A mercaptan like dodecylmercaptan may be used in small amounts as a polymerization initiator, whereas when used in larger amounts it serves as a polymerization modifier. The catalyst system is only important as such systems effect principally the rate of the polymerization reaction. The extent of ions present in a polymerization system due to catalyst, activators, etc., may effect the degree of agglomeration of the latex particles causing prefloc. The electrolyte content of this system should therefore be kept within bounds.

A particularly important aspect of vinylic and graft vinylic fillers is the incorporation of polar groups thereon, especially reactive polar groups capable of bonding physically or chemically not only with the dyestuff but with the material to be reinforced or modified by these colored fillers; the polar groups should be effective in bonding or otherwise modifying coatings, films, and masses prepared from the vinylic pigments from vinylic and graft vinylic fillers per se. Important active groups include those containing oxygen, nitrogen, the halogens such as chlorine, sulfur, and/or a hydrogen donor.

Oxygen plays a prominent role in vinylic and graft vinylic fillers especially in the form of carboxyl and carbonyl groups in helping to fix the dyestuff thereon; such fillers as pigments improve the tensile strength of elastomer vulcanizates when used with certain amines to accelerate curing.

TABLE I.—REPRESENTATIVE VINYLIC FILLER LATEX RECIPES

| Recipe | I-A | I-B | I-C | I-D | I-E | I-F | I-G | I-H | I-J | I-K | I-L |
|---|---|---|---|---|---|---|---|---|---|---|---|
| Water | 300 | 300 | 300 | 300 | 300 | 300 | 300 | 600 | 600 | 600 | 600 |
| Monomers: | | | | | | | | | | | |
| Styrene | 80 | 90 | 80 | 80 | 98 | 80 | 80 | 94 | 96 | 90 | |
| Methacrylic acid | | | | 10 | | 10 | | | | | |
| 4-vinylpyridine | | | | | | | 10 | | | | |
| Acrylic acid | | | | | | | | 4 | | | |
| Methacrolein | | | 10 | | | | | | | | |
| Acrylonitrile | | | | | | | | | 1.5 | | |
| Vinylacetate Divinylbenzene (100% basis) [1] | 10 | 10 | 10 | 10 | 2 | 10 | 10 | 2 | 2 | 10 | |
| Ethyleneglycoldimethacrylate | | | | | | | | | | | 5 |
| Emulsifier: | | | | | | | | | | | |
| Alkyl-aryl sodium sulfonate (Santomerse-3) | 10 | 10 | 10 | 10 | 6 | 10 | 10 | | | | |
| Lauryl sodium sulfonate (Duponol ME) | | | | | | | | | | 0.3 | 0.3 |
| Styrene-Maleic acid copolymer [2] (ratio 47 to 53) | | | | | | | | | | 10 | 10 |
| Polyvinyl alcohol (Elvanol 51-05) | | | | | | | | | | | 1 |
| Catalyst System and Modifiers: | | | | | | | | | | | |
| Diisopropylbenzene hydroperoxide | 0.6 | 0.6 | 0.6 | 0.5 | 0.6 | 0.6 | 0.6 | | | | |
| Tetraethylene pentamine | | | 0.15 | | | | 0.14 | | | | |
| Potassium chloride | 0.5 | 9.5 | 0.5 | 0.5 | 0.5 | 0.5 | 0.25 | | | | |
| Potassium pyrophosphate | 0.21 | 0.21 | 0.07 | 0.1 | 0.21 | 0.07 | 0.07 | | | | |
| Ferrous sulfate | 0.19 | 0.19 | 0.05 | 0.09 | 0.15 | 0.19 | 0.05 | | | | |
| Tertiarydodecyl mercaptan | 0.075 | 0.064 | | 0.075 | 0.075 | 0.08 | | | | | |
| Potassium persulfate | | | | | | | | | | 1.0 | |
| Ammonium persulfate | | | | | | | | 1.0 | 1.0 | | 0.5 |
| Aqueous ammonia 28% | | | | | | | | | | 6.6 | 10 |
| Sodium bisulfite | | | | | | | | 0.5 | 0.5 | 0.5 | 0.3 |
| Polymerization Conditions: | | | | | | | | | | | |
| Temperature | 50 | 60 | 60 | 60 | 60 | 60 | 60 | 60 | 60 | 60 | 70 |
| Time, hours | 12 | 12 | 12 | 12 | 17 | 21 | 12 | 18 | 18 | 18 | 15 |
| Total dry solids, percent | 25.7 | 26.8 | 18.2 | 26.4 | 25.8 | 26.9 | 26.9 | 13.6 | 13.7 | 14.0 | 15.6 |
| Type of vinylic filler | Reactive Aldehyde | Non-Polar | Basic | Acid | Non-Polar | Acid | Pyridine | Acid | Polar | Acid | Acid |

[1] The cross-linking agent divinylbenzene is commercially available in 50% purity.

[2] In 1,300 grams of benzene under reflux are polymerized in 3 hrs. 70 grams of styrene, 80 grams of maleic anhydride catalyzed by 2.25 grams of benzoyl peroxide and modified by 1.5 grams of tert.-dodecylmercaptan.

Table II is illustrative of representative recipes for graft vinylic fillers. In this table core vinylic filler latices from Table I are grafted with additional polymeric material.

It is understood that the term graft vinylic filler is used in the same sense as in my patent application, Ser. No. 538,728, filed Oct. 5, 1955, entitled, "Graft Vinylic Fillers and Their Uses." Core material consists of insoluble particles of colloidal size, that fulfill the definition of vinylic filler particles, and on these particles is polymerized further monomeric material to produce the graft polymer particles of this invention. The graft may be produced in one or several polymerization or condensation steps with the same or different monomers and/or condensation products. The graft so produced on the vinylic filler particles may, depending on the use requirements, be vulcanizable or non-vulcanizable, elastic or plastic, and in the latter case either thermoplastic or thermo-setting.

products either of the phenoplast variety or of the aminoplastic variety or both.

By reactants to form phenoplasts I mean phenol and/or substituted phenol alcohols such as the cresols, xylenols and/or resorcinol, etc., condensable with formaldehyde and/or higher aldehydes such as glyoxal, furfural, etc. In the formation of phenolic resins either acid or basic catalysts can be used and I have found that vinylic and graft vinylic fillers and pigments with surface groups which are either acid or basic can act as catalysts for the formation of phenolplasts. One skilled in the art will appreciate from the disclosures given herein and given in my referred to copending U.S. applications that vinylic and graft vinylic fillers and pigments therefrom can be used in combination with phenoplasts, even when this vinylic filler or graft vinylic filler or vinylic pigment is not of a character to catalyze this formation of the phenoplasts.

TABLE II.—REPRESENTATIVE CRAFT VINYLIC FILLER LATEX RECIPES

| Recipe | II-A | II-B | II-C | II-D | II-E | II-F |
|---|---|---|---|---|---|---|
| Vinylic Filler Latex type | Acid | Non-Polar | Acid | Acid | Acid | Pyridine |
| Latex designation (see Table I) | I-D | I-E | I-D | I-F | I-F | I-G |
| Latex quantity | 410 | 407 | 418 | 410 | 690 | 435 |
| Water | 100 | 50 | | 400 | | 100 |
| Monomers for grafts: | | | | | | |
| Butadiene | 12.75 | | | | 20 | |
| 4-vinylpyridine | 2.25 | | | | | |
| Methylmethacrylate | | 100 | | | | |
| Styrene | | | 20 | | | |
| Methacrolein | | | 10 | | | |
| Catalyst: | | | | | | |
| Azobis (isobutyronitrile) | 0.1 | 1.0 | 1.0 | | 0.5 | |
| Ammonium persulfate | | | | | 0.1 | |
| Chemical Addition Reactions: | | | | | | |
| Dodecyl mercaptan | | | | | 0.85 | |
| Propylene oxide | | | | 20 | | |
| 28% Ammonia | | | | | | 4.8 |
| Urea | | | | | | 13.5 |
| Formaldehyde 36% | | | | | | 42.7 |
| Sodium hydroxide | 0.5 | | | | | 0.1 |
| Butyl mercaptan | | | | | 8.25 | |
| Polymerization Conditions: | | | | | | |
| Polymerization Temperature, °C | 60 | 60 | 60 | 60 | 60 | 60 |
| Polymerization Time, hrs | 17 | 17 | 17 | 48 | 64 | 17 |
| Total Dry Solids, percent | 22.6 | 32.4 | 33.3 | 14.9 | 28.0 | 28.0 |
| Type of graft Vinylic Filler | Acid Base | Polar Acrylate | Acid Aldehyde | Acid Ester | Polar Sulfur | Polar Condensate |

Vinylic fillers or graft vinylic fillers before conversion to a vinylic pigment by addition of dyestuff or after conversion to the vinylic pigment may be treated with reactants capable of forming aldehyde type condensation products either of the phenoplast variety or of the aminoplastic variety or both.

By reactants which form aminoplastics I mean urea, melamine, thiourea and guanidine, etc., condensed with formaldehyde, glyoxal, etc. Again as in the case of phenoplasts the pH can be controlled, and the aminoplastic formation can be catalyzed, by the vinylic or graft vinylic filler or vinylic pigment. One skilled in the art will also appreciate from the disclosures herein given and given in my referred to copending U.S. applications that vinylic and graft vinylic fillers and pigments therefrom can be used in combination with aminoplastics, even when they are not of a character to catalyze the formation thereof.

I use the term phenolplasts in the same manner as used by T. S. Carswell in his book entitled, "Phenoplasts, Their Structure, Properties and Chemical Technology," published in 1947 by Interscience Publishers, Inc., New York, N.Y. I use the term aminoplastics in the same manner that C. P. Vale uses this term in his book entitled, "Aminoplastics," published in 1950 by Cleaver-Hume Press, Ltd., London, England.

The vinylic and graft vinylic pigments with or without other organic or inorganic pigments can act as colored fillers and/or reinforcing pigments for phenolplasts or aminoplastics when such condensates are in excess of the filler. Phenoplasts or aminoplastics may act as grafts or coatings on the vinylic pigment particles when the particles are in excess.

Other condensation products may be applied to the vinylic pigments, for example, polyacids, polyamines, polyalcohols, etc., may be condensed with other polyfunctional substances capable of reacting therewith such as diisocyanates and triisocyanates.

I have also found it useful to add water soluble basic polymers to vinylic filler and graft vinylic filler latices before or after addition of the dyestuff which forms the vinylic pigment.

For example, I used 4-vinylpyridine polymer prepared in a well known manner by dissolving 90 parts of freshly distilled 4-vinylpyridine in 210 parts of 15% aqueous hydrochloric acid, placed it in a pressure bottle which was cooled to 20° C. and 0.9 part of ammonium persulfate were added and the temperature allowed to rise, and polymerization was carried out for 16 hours at 65° C. and 40 hrs. at 80° C. A viscous, slightly yellow solution resulted free from the odor of vinylpyridine. This solution of 4-vinylpyridine polymer is ready for use and when properly neutralized can be added to vinylic and graft vinylic fillers. (See Example 3A, part III.)

Just as it is useful to add a soluble basic polymer it is useful to add a soluble acid polymer to vinylic and graft vinylic fillers before or after such have been converted to a vinylic pigment.

Such an acidic non-cross-linked polymer is prepared, for example, by dissolving 35 parts of glacial acrylic acid free of inhibitor in 600 pts. of water and placing in a pressure bottle after which is added 0.17 pt. of potassium persulfate and 0.08 pt. of acid sodium sulfite. Then the bottle is flushed with nitrogen and placed in an oven for 4 hrs. at 80° C. after which the conversion of monomer to polymer is 100%. The polyacrylic acid can be used as is or neutralized with an alkali such as sodium hydroxide and then added during or after formation of the vinylic pigment. (See Example 11, part III.)

Water soluble amphoteric polymers possessing both acidic and basic groups may also be advantageously used with vinylic pigments or during the formation of such fillers.

In 250 ml. of benzene was mass polymerized for 4 hours 43 grams of methacrylic acid and 51 grams of 4-vinylpyridine catalyzed by 1.0 gram of azobis(isobutyronitrile). After the mass polymerization was complete the copolymer powder was filtered from the benzene and dried (see Example 22A, part IV). This copolymer has molar quantities of the acidic and basic vinyl monomers making it amphoteric, however, any ratio of the constituents desired can be used and other vinyl monomers such as styrene, vinylacetate, etc., can be employed therewith. Polyacrylic acid, methacrylic acid, the polyvinylpyridines, polydimethylaminoethylmethacrylate, etc., can be mass polymerized in this manner. Even vinyl monomers such as styrene and vinylacetate can in molar quantities be mass copolymerized with maleic anhydride in a similar manner (see vinylic filler latex recipe I–L). These polymers are especially suitable as emulsifiers not only for the vinylic fillers or graft vinylic fillers but also to prepare elastomers of the diene type and the diene-vinyl copolymer types, elastomers of the seeded type and plastomers especially when a small amount of a surfactive agent is used such as lauryl sodium sulfonate (Duponol ME) to assist these polymeric emulsifiers in reducing the surface tension and producing satisfactory polymer latices. From 1 to 10% surfactive agent is used based on the quantity of polymeric emulsifier employed.

A mode of obtaining ester groups is exemplified in Table II, Recipe II–D, viz: The graft vinylic filler with acid surface groups, was reacted with propylene oxide to convert a part of these carboxyl groups into ester groups. The introduction of sulfur groups is exemplified in Recipe II–E, by reacting butyl mercaptan on unsaturated groups of an unsaturated graft on the vinylic filler.

It is understood that recipes given are illustrative only, and one skilled in the polymerization art will recognize that there are many variations which can be made in such recipes, guided by the criteria herein disclosed that in selecting a recipe it is essential to control the colloidal particle size for the particular application required, and the surface activity of the vinylic filler or the dyestuff and type of fixation desired.

(II)

The present invention shows that:

(1) Basic vinylic fillers can be prepared with basic monomers like vinylpyridine or dimethylaminoethylacrylate or like monomers and acid wool dyes will then bond to such basic vinylic fillers.

(2) Acidic vinylic fillers prepared with carboxylic acid groups on their neutral surfaces are dyed with certain basic dyes which fact can be attributed to ionic coupling.

(3) Certain acid dyes will readily combine with acidic vinylic fillers which cannot be explained on the ionic basis, but better by the substantive theory of hydrogen bonding. Acid dyes and acidic vinylic fillers are easily fixed together by the use of heavy metal salts.

(4) By preparing amphoteric or mixed acid and basic graft vinylic fillers, that is by grafting onto an acid vinylic filler with a graft containing basic groups, then either acid or basic dyes or both together can be bonded and such bonding may be accounted for as an ionic bond.

(5) By blending acidic vinylic fillers and basic vinylic fillers either dry as latices, the latter being preferred because of simplicity of handling, either direct or acid or basic dyes can be used, especially where heavy metals are added to fix such dyestuffs.

(6) If the basic or acid dye is in the form of a salt then one of the blended vinylic fillers, or one component of the amphoteric or acid and basic vinylic filler, can remove the salt component of the dyestuff while the other removes the dyestuff from solution.

(7) Vinylic fillers of the non-polar type, provided they are made without emulsifier or with a suitable emulsifier, will adsorb certain dyes from water solutions thereof. This effect must be due to the colloidal size of the vinylic filler, i.e., the fact that it is a minute particle with high surface energy. Thus, it is apparent that the vinylic filler particle is ideally suited as a medium for dye adsorption.

(8) By having reactive groups on the vinylic filler complementary to those on a dyestuff, chemical coupling can take place between such reactive groups. For example vinylic fillers prepared to contain carbonyl groups, especially the aldehyde group, will chemically bond with complementary reactive groups such as amine groups of a basic dyestuff.

(9) Tannin-tartar emetic and the like (known mordant in the dye industry) are also useful precipitants to be used to fix dyestuffs on vinylic fillers. Thus, if basic dyestuffs are to be fixed to either acid or neutral vinylic fillers then a tannin-tartar emetic can effectively be used, and the amount of mordant required is of the order of magnitude of that used when cotton fibers are mordanted for dyeing purposes.

(10) The acids of tungsten, molybdenum and their mixtures, the phospho-tungstic acids and the phosphomolybdic acids (known laking precipitants for the basic dyes) may be used to advantage in forming vinylic pigments from basic dyes, especially when color stability or shade control are desired. In producing vinylic filler pigments the phosphometal lake substrate can be formed in the presence of the vinylic filler particles, the dye being subsequently added, or the phosphometal lake substrate may be formed with the dyestuff after the dye has been adsorbed by the vinylic filler particles. By providing vinylic filler particles surfaced with a nitrogen compound such as vinylpyridine which will also complex with metals such as molybdenum then the basic dye can be bound to the vinyl filler via such a metal complex.

(11) Acid dye can be combined or laked with vinylic filler, e.g., an acidic vinylic filler, or can form a vinylic filler pigment, then to further fix the dye onto the particles of the vinylic filler latex an alkaline earth or a heavy metal salt may be used. This procedure also precipitates the acid vinylic filler pigment particles from the latex. The hue of the dye is usually effected by the choice of the heavy metal salt which may be aluminum, zirconium, barium, calcium, manganese, tin, antimony, lead, copper and like salts.

(12) Calcium-aluminum lakes for such dyestuffs as the Alizarin class, can be formed in the presence of vinylic fillers, especially acidic vinylic fillers. Examples of this type of vinylic pigment are given hereinafter.

(13) Vinylic pigments from azoic colors can be easily reproduced with uniform particle size and at a colloidal size range not obtainable by the usual technique of producing azoic pigments, thereby enabling such pigments to be easily reproduced with accurate control of color shade and depth.

(14) Vinylic pigments can be prepared from vat dyes. When the leuco compound of a vat dye is added to a vinylic filler, then the leuco compound fixes itself on the surface of the vinylic filler particles during the oxidation to the insoluble vat dye resulting in a vinylic pigment. This is an especially advantageous procedure, as the formation of such vinylic filler pigments from vat dyes does away with the grinding which is usually necessary when attempts are made to prepare vat dyes as pigments. Furthermore, a similar quantity of dyestuff gives deeper shades because the dye is prepicitated on the surfaces of the colloidal sized vinylic filler particles.

(15) Vinylic pigments are especially applicable where depth of color and transparency are desired, however, where covering power is also essential then the vinylic pigments are combined with inorganic or organic pigments having the desired covering power.

(16) Vinylic pigments especially those in which the dyestuff is fixed thereon can be used as latices, as wet filter cakes, as dry powders, as water slurries from such dry powders, and for certain uses can be combined with ingredients which form water soluble resins which are heat convertible to water insoluble resins and by this I mean ingredients which form heat convertible phenoplasts and aminoplastics.

Thus, the numerous examples of this invention hereinafter set forth demonstrates that all classes of dyestuffs capable of dyeing textiles can be used to form vinylic pigments for various uses by properly combining such dyes with suitable vinylic fillers. Therefore, a vinylic pigment may be construed as the combination of a water soluble or dispersible dyestuff component and a vinylic filler in such a manner that the dyestuff is adsorbed on the surface of the vinylic filler during drying or fixed on the surface of filler particles against removal under the conditions of intended use.

The vinylic pigments of the following examples were prepared in a high speed Waring-type Blendor and this device consists of a mixing bowl with a stirrer mounted through the bottom driven by a high speed electric motor in the base. The stirrer consists of short blades with cutting edges capable of dispersing materials. A rheostat is provided to control the current to the stirring motor thus permitting the stirrer rotary speed to be controlled throughout a wide range between a few r.p.m.s to several thousand r.p.m.s.

When dyestuffs are being adsorbed and fixed on the surface of insoluble, colloidal sized vinylic type filler particles it is very helpful to have the advantage of the excellent agitation provided by a high speed blendor. When the vinylic type latices and dyestuff are precipitated with heavy metals forming thick dispersions then the excellent agitation of the high speed blendor is very useful.

In all the examples given hereafter, when the dyestuff has been fixed then the fixing method has been worked out so that there is complete removal of the dyestuff from solution. In the following examples the dyestuff or dyestuff components have been dissolved usually in water at 90° C. and this solution added to the vinylic type latex in the high speed blendor. After mixing well the mixture may then be dried to form the vinylic pigment or the dyestuff can be fixed to the vinylic type filler by various means such as pH adjustment, addition of mordant, heavy metal salt, etc., forming the vinylic pigment. Then such pigment is diluted with water, filtered and the filter cake is washed and dried or flushed with an organic carrier to form flushed colors. It is understood that the vinylic pigment latex may be spray dried or dried by other suitable means.

The essential feature of the present invention is the coloration of organic colloidal substrate while retaining the colloidal properties and thus producing a very fine pigment; such pigments are highly economical because the color is on the surface only of the vinylic filler pigment particles. Thus it is possible by this means to produce cheaper pigments with better tinctorial properties and improved light fastness and to prepare color pigments when the dyestuff is fixed which do not bleed in water, or in hydrocarbons, as desired.

The examples set forth hereinafter are presented to demonstrate that vinylic pigments are formed from vinylic type fillers and water soluble or dispersible dystuffs and dyestuff components. Such examples are representative and not restrictive and have been selected utilizing dyestuffs classified according to the method of applying such dystuff in the art of textile dyeing. The classification selected is that used in the 1954 Technical Manual and Yearbook of the American Association of Textile Chemists and Colorists, vol. XXIX, pp. 178, 277, and consists of the following subgroups of dyestuffs applied to vinylic type fillers to form vinylic pigments.

Table:         Dyestuff classification

III _____ Acid dyestuffs.
IV _____ Basic dyestuffs.
V _____ Direct dyestuffs.
VI _____ Direct and development dyestuffs.
VII _____ Direct dyestuffs for cellulose acetate.
VIII _____ Azo colors.
IX _____ Metal mordant dyestuffs:
      (a) Mordant acid.
      (b) Acid (metal).
      (c) Anthraquinone mordant.
      (d) Anthraquinone (acid).
X _____ Vat dyes:
      (a) Leuco esters of vat dyes.
XI _____ Sulfur dyes.

TABLE III.—VINLYIC PIGMENTS FROM ACID DYESTUFFS

| Example Number | Dyestuff | Supplier [1] | Dyestuff Identification [2] | Dyestuff Classification | V. F. Latex Identification | V. F. Latex Type |
|---|---|---|---|---|---|---|
| 1 | Alphazurine A Conc. 150% | NAC | C.I. 673 | Acid | I-D | Acid. |
| 1 | Calcocid Fast Yellow 3G Ex. Conc. | CCC | C.I. 636 | do | I-D | Do. |
| 3 | Croceine Scarlet MOO #90 | NAC | C.I. 252 | do | I-D | Do. |
| 3A | do | NAC | C.I. 252 | do | I-F | Do. |
| 4 | Eosine OJ Conc. 145% | NAC | C.I. 768 | do | I-D | Do. |
| 5 | Fast Acid Yellow 5G Conc. | NAC | AATCC-Pr. 492 | do | I-G | Basic. |
| 6 | Calcocid Fast Yellow 3G Ex. Conc. | CCC | C.I. 636 | do | I-G | Do. |
| 7 | Acid Green | Ciba | C.I. 666 | do | I-G | Do. |
| 8 | Methylene Blue 2B | NAC | C.I. 922 | Basic | II-A | Acid-Basic. |
| 8A | Alizarine Sapphire BN Conc. | NAC | C.I. 1054 | Acid | II-A | Do. |
| 9 | Wool Violet 4BN | NAC | C.I. 697 | do | I-D (Dry) | Acid. |
| 10 | Wool Orange A Conc. | NAC | C.I. 151 | do | I-D (Dry) | Do. |
| 11 | Acid Violet 6BN | Ciba | C.I. 717 | do | I-J | Polar. |
| 12 | Acid Black HA Conc. | do | C.I. 246 | do | I-H | Acid. |
| 13 | Alizarine Green CG Ex. Conc. | do | C.I. 1078 | do | I-K | Do. |
| 13A | do | do | C.I. 1078 | do | I-L | Do. |

[1] NAC=National Aniline Division, Allied Chemical & Dye Corporation.
CCC=Calco Chemical Division, American Cyanamid Company.
Ciba=Ciba Company, Inc.
[2] C.I.=Colour Index, Society of Dyers and Colourists.
AATCC Pr.=American Association of Textile Chemists and Colourists Protype Number.

(III) VINYLIC PIGMENTS FROM ACID DYESTUFFS

The following examples are of vinylic pigments formed from the combination of acid dyes and vinylic fillers.

Example 1

Into the high speed blendor were added 200 ml. of acidic vinylic filler latex type I-D containing 26.4% solids, 15 grams of polypropylene glycol 1025 (Carbide and Carbon Chemical Co.), 200 ml. of water, 5 grams of Alphazurine A Conc. 150% dissolved in 100 ml. of water 90° C. and mixed for ten minutes. The vinylic pigment formed was a deep blue, which color was held when the total mixture was dried in warm air.

Example 2

This example was prepared in a manner and quantity similar to the previous example except in place of the Alphazurine A Conc. 150% there was added 5 grams of Calcocid Fast Yellow 3G Ex. Conc. The dry vinylic pigment was bright yellow.

Example 3

This example was prepared in a manner and quantity similar to the previous examples except that in place of Calcocid Fast Yellow 3G Ex. Conc. there was added 5 grams of Croceine Scarlet MOO 90, and the resulting dry pigment was a bright scarlet red color.

Example 3A

To the high speed blender was added 150 ml. of acidic vinylic filler latex type I-F containing 26.9% dry solids, 10 grams of Crocein Scarlet N Extra (Du Pont) dissolved in 100 ml. of water at 95° C. and 40 ml. of 30% polyvinylpyridine hydrochloride, the preparation of which was heretofore described and this polymer solution was further diluted with 200 ml. of water. The polyvinylpyridine solution was added to the high speed blender while the contents of the blender were rapidly agitating and when this addition was completed most of the dyestuff was bound to the polymer. The mixture was permitted to agitate for 20 minutes then 5 grams of sodium tungstate dissolved in 50 ml. of water were added. The red vinylic pigment filtered easily and the filtrate was free of color. The filter cake was redispersed in 500 ml. of water followed by filtration and this washing was again repeated. The resulting filter cake can be used as is, flushed with a vehicle, or the water removed yielding the dry vinylic pigment.

Example 4

To the high speed blender was added 100 ml. of acid vinylic filler latex type I-D, 300 ml. of water, 15 grams of Eosine OJ Conc. 145% dissolved in 200 ml. of water at 90° C. The mix was agitated for 15 minutes during which time it was heated to 60° C. by steam through the steam tube. At this point the mixture can be dried to form a vinylic pigment, however, I preferred to fix the dyestuff by adding 10 grams of lead nitrate dissolved in 100 ml. of water and the beautiful red color developed. The red vinylic pigment was filtered and the filtrate was free of color. The filler cake was washed and the vinylic pigment was dried.

Example 5

To the high speed blender with agitation was added 100 ml. of basic vinylic filler latex type I-G containing 26.9% solids, 250 ml. of water, 10 grams of Fast Acid Yellow 5G Conc. dissolved in 200 ml. of water at 90° C. Then the mixture can be dried to a vinylic pigment, however, I preferred to fix the dyestuff by adding 10 grams of barium chloride and the mixture agitated in the blender for 15 minutes. The resulting yellow vinylic pigment was filtered, washed and dried.

Example 6

To the high speed blender was added 70 ml. of basic vinylic filler latex I-G, 100 ml. of water, 2 grams of Calcocid Fast Yellow 3G Ex. Conc. dissolved in 100 ml. of water at 90° C. and agitated for 10 minutes. The mixture can be dried to a vinylic pigment, however, I preferred to fix the dyestuff by adding 5 grams of zinc chloride and heating the mix to 95° C. by steam through the steam tube while agitating for 10 minutes. The resulting bright yellow vinylic filler was filtered, washed and dried.

Example 7

To the high speed blender was added 200 ml. of basic vinylic filler latex type I-G, 200 ml. of water, 10 grams of Acid Green dissolved in 200 ml. of water at 90° C. and the mixture was agitated for 10 minutes then 10 ml. of formic acid was added and the thickened mass agitated for another 10 minutes. The resulting mixture can be dried to a vinylic pigment, however, I preferred to fix the dyestuff by adding 10 grams of barium chloride dissolved in 50 ml. of water. The mix was stirred for an additional 15 minutes after adding 500 ml. of water and then filtered with the filtrate being free of color. The resulting organic vinylic pigment was carefully washed and was ready for drying. To the vinylic pigment wet filter cake placed in the high speed blender was added 200 ml. of water and 10 grams of titanium dioxide pigment Ti-Pure-R and the mixture was agitated 10 minutes, filtered and the filter cake dried yielding the vinylic pigment-inorganic pigment combination.

It is, of course, understood when the addition of material such as water is more than the high speed blender bowl can accommodate, then the batch is split into two or three portions and separately agitated and this applies to all examples where the quantities of materials used are in excess of the stirrer bowl capacity.

Example 8

The following example illustrates a blue pigment prepared from both a basic dyestuff, Methylene Blue 2B and an acid dyestuff, Alizarine Sapphire BN Conc. and a vinylic filler containing both acid and basic groups.

To the high speed blender was added 200 ml. of vinylic filler latex type II–A containing 22.6% solids, 500 ml. of water, 5 grams of Methylene Blue 2B dissolved in 100 ml. of water at 90° C. and then was added 5 grams of Alizarine Sapphire BN Conc. 150% dissolved in 100 ml. of water at 90° C. and the mixture was agitated for 15 minutes in the blender. The resulting mixture can be dried to a vinylic pigment, however, I preferred to fix the dyestuff by adding 10 grams of barium chloride dissolved in 100 ml. of water, followed by agitation for 10 minutes to fix the vinylic pigment. The pigment was filtered and the filtrate was free of color and the wet filter cake was water washed and dried.

A dry vinylic filler material can be producred by carefully drying vinylic filler latices, that is by not subjecting such latices during drying to excess heat or, that is drying at moderate temperatures, for example, by spray drying or by lyophilization and thereby producing a dry vinylic filler powder which will redisperse in certain polar solvents and in solvent mixtures containing polar and non-polar solvents and in other low molecular weight material and in polymeric material such as natural rubber, synthetic elastomers and plastomers with or without the aid of a dispersing agent, to yield colloidal type dispersions of such dry vinylic fillers in such polymeric materials thereby reinforcing such materials when such are capable of being reinforced.

I have found that vinylic filler latices dried in the manner described above are suitable to form vinylic pigments. I am providing two examples of vinylic pigments formed from dry vinylic fillers and acid dyestuffs as illustrative of this fact that reconstituted aqueous dispersions of vinylic filler particles from dry vinylic fillers and vinylic filler latices can be used interchangeably in this invention.

Example 9

Dry vinylic filler material was prepared by spray drying vinylic filler latex type I–D and 5 grams of such dry material was added to the high speed blender, then was added 250 ml. of water and 30 ml. of 10% caustic soda solution. The mix was agitated for 10 minutes and heated by steam from the steam tube to 95° C. and then was added 5 grams of Wool Violet 4BN dissolved in 100 ml. of water at 95° C. and after agitating vigorously for 5 minutes. The resulting mixture can be dried to a vinylic pigment, however, I preferred to fix the dyestuff by adding 10 grams of barium chloride and 2 ml. of 90% formic acid dissolved in 250 ml. of water and the agitation was continued for another 5 minutes. The resulting blue vinylic pigment was filtered and reslurried in 500 ml. of water containing 5 grams of barium chloride. Again the pigment was filtered and the filtrate was free of color and the resulting filter cake was dried yielding the blue vinylic pigment.

Example 10

To the high speed blender was added 10 grams of spray dried vinylic filler material (prepared from vinylic filler latex type I–D) and 5 grams of Wool Orange A Conc. and 250 ml. of water. After rapidly agitating, the mix was light orange and could be dried to a vinylic pigment, however, there was added 30 ml. of 10% caustic soda and the mix turned brown, and after 5 minutes was added 10 grams of barium chloride and 2 ml. of glacial acetic acid dissolved in 250 ml. of water. The mix was allowed to agitate for 10 minutes during which time the color changed from brown to bright orange. The resulting orange vinylic pigment was filtered, reslurried in 500 ml. of water and again filtered and this filtrate was free of color and the filter cake was dried to yield the orange vinylic pigment.

Example 11

In this example the vinylic filler latex was prepared free of emulsifier and had a particle size in the upper colloidal range and was blended with water soluble sodium polyacrylic acid and then the dyestuff and coagulant was added forming the vinylic pigment.

To the high speed blendor was added 200 grams of latex type I–J solids content 14.2%, 100 grams of 5.5% polyacrylic acid the preparation of which was heretofore described, 5 grams of caustic soda dissolved in 100 ml. of water, 10 grams of Acid Violet 6BN dissolved in 200 ml. of water at 90° C., cooled to 60° C. and 25 ml. of isopropanol was added and this solution was given to the blendor and the mixture was agitated for 5 minutes after which time it could have been dried down to form a vinylic pigment, however, instead the dyestuff was fixed by adding 20 grams of barium chloride dissolved in 150 ml. of water. The violet-blue pigment which formed was filtered, washed and dried.

Example 12

This example was also prepared with emulsifier free vinylic filler latex and had a particle size in the upper colloidal range.

To the high speed blendor was added 200 grams of latex type I–H solids content 13.6% in 200 ml. of water, 10 grams of Acid Black HA Conc., dissolved in 200 ml. of water heated to 90° C. and the mixture was agitated for 5 minutes, followed by the addition of 10 grams of aluminum chloride dissolved in 200 ml. of water after which the agitation was continued for another 10 minutes. The vinylic pigment mix was diluted with an equal volume of water, filtered and dried.

Example 13

This example was also prepared from a vinylic filler with a polymeric emulsifier that is such filler is a multipolymer vinylic filler prepared from a hydrophilic polymer.

To the high speed blendor was added 150 grams of latex type I–K, solids content 14.0%, 200 ml. of water, 10 grams of Alizarine Green CG Ex. Conc. dissolved in 200 ml. of water at 90° C. and agitated for 10 minutes. The mixture can be dried to a vinylic pigment, however, I preferred to fix the dyestuff to the pigment by adding 10 grams of aluminum chloride dissolved in 200 ml. of water. The resulting vinylic pigment suspension was filtered and the filter cake washed free of soluble salts and dried.

Example 13A

This example is similar to Example 13 in that polymeric emulsifier is used to prepare the graft formed vinylic filler, only in this case the principal monomer is vinyl acetate which is a very useful monomer for this purpose both from the standpoint of availability and price.

To the high speed blendor was added 100 ml. of graft formed acidic vinylic filler type I–L, solids content 15.6%, 200 ml. of water, 10 grams of Fast Alizarine Green CG Ex. Conc. dissolved in 100 ml. of water at 95° C., followed by 5 grams of chromium acetate dissolved in 50 ml. of water, then 10 grams of lead nitrate dissolved in 100 ml. of water. This mixture was well agitated for 5 minutes, then 5 ml. of 28% aqueous ammonia was added and the mass thickened up, then 200 ml. of water was added and the mix filtered. The filtrate was free of color and the dark green filter cake was redispersed in 500 ml. of water and again filtered. The resulting filter cake was usable as is or was flushed with suitable vehicle, or dried to the vinylic pigment.

(IV) VINYLIC PIGMENTS FROM BASIC DYESTUFFS

The examples given hereafter illustrate how basic dyestuffs can be combined on vinylic filler particles to produce vinylic pigments and the dyestuff may be fixed thereto with or without the aid of a mordant to produce insoluble, colloidal size vinylic pigment particles of wide application where the brilliant basic colors can be used.

Example 14

In the high speed blendor was added 200 ml. of vinylic filler latex type I–D containing 26.4% solids, 15 grams of propylene glycol 1024, 200 ml. of water, a solution of 5 grams of Victoria Green WB Crystals dissolved in 100 ml. of water at 95° C. The dyestuff was added to the mix in the high speed blendor and agitated well for 15 minutes. By testing on filter paper no bleeding was observed. The vinylic pigment suspension was diluted with equal parts of water, filtered, and the filter cake was washed free of soluble salts, the resulting vinylic pigment cake was ready for flushing, or to be used as is, or to be dried.

After mixing well for 10 minutes 5 grams of tannic acid dissolved in 50 ml. of water was added followed by 10 grams of antimony potassium tartrate dissolved in 80 ml. of water. The product was diluted with an equal volume of water, filtered, washed, and dried. The dye was fixed to the vinylic filler as there was no bleeding during filtration and washing.

Example 17A

To the high speed blendor was added 200 grams of non-polar vinylic filler latex type I–B having 26.8% total dry solids, 20 grams of Astra Phloxine FF Ex. High Conc. dissolved in 450 ml. of water at 90° C. and after mixing for 5 minutes 25 grams of titanium dioxide pigment Ti-Pure-R were added and agitation continued for another 5 minutes followed by the addition of 10 grams of tannic acid and 10 grams of antimony potassium tartrate. The vinylic pigment was filtered from the liquid, washed and dried.

The following examples illustrate the use of tungstic, molybdic, and complex phosphotungstomolybdic acid as

TABLE IV.—VINLYIC PIGMENTS FROM BASIC DYESTUFFS

| Example Number | Dyestuff | Supplier | Dyestuff Identification [1] | Dyestuff Classification | V. F. Latex Identification | V. F. Latex Type |
|---|---|---|---|---|---|---|
| 14 | Victoria Green WB Crystals | NAC | C.I. 657 | Basic | I-D | Acid. |
| 15 | Fuchsine Y Fine Crystals | NAC | C.I. 677 | do | I-D | Do. |
| 16 | Auramine O Conc | NAC | C.I. 655 | do | II-A | Acid Basic. |
| 17 | Astra Phloxine FF Ex. High Conc | NAC | Schultz 930 | do | I-B | Non Polar. |
| 17A | do | NAC | do | do | II-A | Acid Basic. |
| 18 | Methyl Violet 2B Conc. 125% | NAC | C.I. 680 | do | I-G | Basic. |
| 19 | Crystal Violet Superfine | NAC | C.I. 681 | do | I-G | Do. |
| 20 | Calcozine Blue B Ex. Conc | CCC | C.I. 729 | do | I-G | Do. |
| 21 | Calcozine Red 6G Ex | CCC | C.I. 752 | do | I-G | Do. |
| 22 | Rhodamine B Conc. 500% | NAC | C.I. 749 | do | II-A | Acid Basic. |
| 22A | do | NAC | C.I. 749 | do | I-K | Acid. |

[1] Schultz=Gustav Schultz Farbstofftobellen, Leipzig 1931.

Example 15

Similar to the previous example except instead of the basic dye Victoria Green WB Crystals, 5 grams of Fuchsine Y Fine Crystals was used. The resulting vinylic pigment was dried.

The more alkaline basic dyes precipitate completely with an acid resin, however, when the less alkaline colors bleed slightly, then one must mordant the basic color with a fixing agent, such as tannin tartar emetic, or a metallic mordant, such as molybdic, or tungstic acid, or with a condensate of phenol or urea and formaldehyde, or with a protein such as casein or albumen. A good description of these methods will be found in Louis Diseren's book entitled "The Chemical Technology of Dyeing and Printing," published in 1951 by Reinhold Publishing Corp., New York, N.Y. In volume II, Chapter 7, entitled "Basic Dyestuffs" are reviewed the various methods of fixing basic dyestuffs and such methods can also be used to fix dyestuffs on vinylic type fillers.

The following example illustrates the use of the tannic acid-tartar emetic method.

Example 16

In the high speed blendor was placed 200 ml. of graft vinylic filler latex type II–A containing 22.6% solids and 500 ml. of water; then 10 grams of Auramine O Conc. 130% dissolved in 200 ml. of water at 95° C. was added to the high speed blendor and stirred well. A solution of 8 grams of tannic acid to 40 ml. of water was prepared and added followed by 12 grams of antimony potassium tartrate dissolved in 50 ml. of water. After mixing the vinylic pigment was filtered, washed, and dried.

Example 17

In the high speed blendor was added 200 ml. of graft vinylic filler latex type II–A and 400 ml. of water. Further to the diluted latex was added 10 grams of Astra Phloxine FF Ex. High Conc. dissolved in 200 ml. of water at 90° C.

metallic mordants for the basic dyes in conjunction with basic or vinylic fillers to form new and useful vinylic pigments. Various compositions of the complex phosphomolybdic, tungstic, and their combinations, are discussed in Lyde S. Pratt's book entitled "Chemistry and Physics of Organic Pigments," published in 1947 by John Wiley & Sons, Inc., New York, N.Y. Refer to pp. 153–172; and such methods can be used to fix the basic dyestuffs on vinylic type fillers.

I have discovered that the basic vinylic fillers are very useful as they will mix complex with the above type of complexing salts as do the basic dyestuff; i.e. vinylic fillers with vinylpyridine groups form such complexes.

Example 18

To the high speed blendor was added 200 ml. of vinyl filler latex type I–G containing 26.9% solids and 400 ml. of water. With rapid stirring was further added 10 grams of Methyl Violet 2B Conc. 125% dissolved in 100 ml. of water at 95° C.; after agitating for 10 minutes there was added a solution of 5 grams of ammonium molybdate dissolved in 50 ml. of water and 2 ml. of conc. hydrochloric acid dissolved in 20 ml. of water. After stirring for 5 minutes the steam tube was opened and the mass heated while agitating until after 15 minutes the temperature had reached 95° C. The mix was then diluted with an equal volume of water and the vinylic pigment filtered off, carefully washed free of soluble material and was ready for use as a wet pigment paste, or the water could be removed to produce the dry vinylic pigment. No color bleeding was observed during the filtering and washing of the wet vinylic pigment pulp.

Example 19

This example was prepared in a quantity and a manner similar to the preceding example except that in place of the Methyl Violet there was used 10 grams of Crystal Violet Super Fine and in addition to the ammonium molybdate was added 2 grams of disodium phosphate dissolved in 20 ml. of water. The vinylic pigment was carefully washed and during this filtration operation no color was present in the filtrate indicating a stable pigment had formed.

Example 20

This example was prepared in quantity and in a manner similar to the previous example except that in place of Crystal Violet there was used 10 grams of Calcozine Blue B Ex. Conc. (Victoria Blue B) and as metallic mordant for this basic dyestuff in place of the ammonium molybdate and disodium phosphate was used 5 grams of sodium tungstate dissolved in 50 ml. of water. The blue vinylic pigment formed with complete exhaustion of color from the water, and it was carefully washed and dried.

Example 21

This example was prepared in a manner and quantity similar to the previous example except in place of the basic dyestuff Victoria Blue, was used 10 grams of Calcozine Red 6G Ex. (Rhodamine 6G) and as metallic mordant in addition to the sodium tungstate there was added 2 grams of disodium phosphate dissolved in 20 ml. of water. The red vinylic pigment formed with complete exhaustion of the basic color from the water medium, and it was carefully filtered, washed and dried.

Example 22

To the high speed blendor was added 200 ml. of graft vinylic filler latex designated as type II–A, 500 ml. of water, 10 grams of Rhodamine B Conc. 500% dissolved in 200 ml. of water at 90° C., and the mix was well agitated. The metallic mordant solution was prepared by dissolving 1.7 grams of sodium molybdate, 3.0 grams of sodium tungstate and 1.1 grams of disodium phosphate in 50 ml. of warm water. Following the addition of the mordant solution of the blendor there was added 5 ml. of concentrated hydrochloric acid (37% HCl) diluted with 30 ml. of water. The steam tube was opened and during 15 minutes the mix was heated to 90° C., during which period it was vigorously agitated in the blendor. The violet red vinylic pigment formed with complete exhaustion of the basic color from the water, and it was carefully filtered and washed free of soluble material and ready for use as a wet pulp or, on removal of water as a dry vinylic pigment.

I have found the basic dyestuff used to color paper pulp to be very suitable when mordanted with tannic acid-tartar emetic combination or when mordanted with a heavy metal mordant. Useful basic dyes are described in E. I. du Pont de Nemours & Co., Inc., Dyestuffs Div., Wilmington, Del., dye book entitled, "Du Pont Dyes for Paper." The basic dyes given herein are illustrative of a type of dye I have found suitable to form vinylic pigments and such selection is not to be construed as restrictive since the procedures outlined in the examples can be applied to all basic dyestuffs.

The selection of mordant can be varied both in type and quantity to fix basic dyestuffs to vinylic fillers to form vinylic pigments. Then to one skilled in the art of dyeing with basic dyestuffs the broad application of the use of these dyes with vinylic fillers in the formation of vinylic pigments will be understood and the wide application of these new vinylic pigments both in the coloring of paper, natural fibers, synthetic fibers and film forming materials will be appreciated.

Example 22A

To the high speed blendor was added 150 ml. of graft formed acidic vinylic filler latex type I–K having 14.0% total dry solids, 10 grams of Rhodamine B Conc. dissolved in 100 ml. of water at 95° C., 10 grams of vinylpyridine-methacrylic acid copolymer prepared as heretofore described, dissolved in 100 ml. of water containing 2 ml. of formic acid, followed by 8 grams of tannic acid dissolved in 100 ml. of water at 95° C. After 15 minutes of agitation the mix was diluted with 500 ml. of water and filtered. The filter cake was redispersed in 500 ml. of water and 10 grams of zinc sulfate dissolved in 100 ml. of water was added and the mix agitated for 10 minutes and filtered. The filtrate showed no color bleeding and the filter cake was ready for use as is, or to be flushed with a suitable vehicle, or to be dried yielding the vinylic pigment.

TABLE V.—VINYLIC PIGMENTS FROM DIRECT DYESTUFFS

| Example Number | Dyestuff | Supplier [1] | Dyestuff Identification | Dyestuff Classification | V.F. Latex Identification | V.F. Latex Type |
|---|---|---|---|---|---|---|
| 23 | Calcodur Orange GL Conc | CCC | C.I. 653 | Dir | I-D | Acid. |
| 24 | Direct Fast Orange WS | Ciba | C.I. 326 | Dir | I-D | Do. |
| 25 | Brilliant Yellow C | NAC | C.I. 364 | Dir | I-D | Do. |
| 26 | Stilbene Yellow 3GA Conc | G | C.I. 622 | Dir | I-D | Do. |
| 27 | Calcodur Resin Fast Red 3B | CCC | | Dir | I-D | Do. |
| 28 | Solantine Yellow 4GL 125% | NAC | AATCC-Pf. 53 | Dir | I-D | Do. |
| 29 | do | NAC | AATCC-Pr. 53 | Dir | I-G | Basic. |
| 30 | Calcoform Blue R Conc | CCC | AATCC-Pr. 22 | Dir.-Formald | II-F | Basic, urea-Formald. |

[1] Ciba=Ciba Co., Inc., New York; G=General Dyestuff Corp.

(V) VINYLIC PIGMENTS FROM DIRECT DYESTUFFS

The following examples illustrate the formation of vinylic pigments by combining direct dyes with vinylic fillers. The direct dyes are used for the direct dyeing of cellulose and I have found these dyes can form a broad class of vinylic pigments. Vinylic type filler latices can be combined with direct dyestuffs and dried down to form vinylic pigments, however, I preferred to fix the direct dyestuffs on the vinylic type fillers forming vinylic pigments from which the color cannot be washed away by water.

Example 23

To the high speed blendor was added 10 ml. of acidic vinylic filler containing 26.4% solids, 500 ml. of water, 10 grams of Calcodur Orange GL Conc. dissolved in 100 ml. of water at 90° C. After agitating the mix for 10 minutes in the blender 10 grams of barium chloride dissolved in 200 grams of water were added. The deep orange vinylic pigment was filtered and the filtrate was free of color. Then the filter cake was washed and dried.

Example 24

This example was prepared in quantity and manner similar to the previous example, except that in place of Calcodur Orange GL Conc. there was added 10 grams of Direct Fast Orange WS and again after addition of the barium chloride the deep red vinylic pigment formed. The pigment was filtered and the filterate was free of color. The filter cake was then washed and dried.

Example 25

To the high speed blendor while agitating was added 100 ml. of acidic vinylic filler latex type I–D, 250 ml. of water and 10 grams of Brilliant Yellow G dissolved in 200 ml. of water at 90° C. The color was an orange yellow after three minutes of agitation in the blendor; then was added 10 grams of barium chloride dissolved in 200 ml. of water and the color changed from orange yellow to mustard-yellow and agitation was continued for 10 minutes. The resulting vinylic pigment was filtered and the filtrate was free of color. The filter cake was then washed and dried.

Example 26

This example was prepared in a manner similar to the previous example, except that instead of Brilliant Yellow C there was added 10 grams of Stilbene Yellow 3GA Conc. The yellow pigment did not bleed in filtering, and after washing it was dried.

Example 27

To the high speed blendor was added 100 ml. of acidic vinylic filler latex type I–D containing 24.4% solids, 250 ml. of water, 25 ml. of 10% caustic soda solution, 10 grams of Calcodur Resin Fast Red 3B dissolved in the blendor in 200 ml. of water at 90° C. After agitating in the blendor for 10 minutes was added 15 grams of lead nitrate dissolved in 250 ml. of water and the agitation continued another 10 minutes. A deep red-purple vinylic pigment resulted which was filtered and the filtrate was free of color. The filter cake was carefully washed and dried.

Example 28

This example was prepared in a manner and quantity similar to the previous example except that instead of Calcodur Resin Fast Red 3B was added 10 grams of Soltaine Yellow 4GL Conc. 125%. The resulting pigment after addition of the barium chloride was a strong yellow color. On filtering this vinylic pigment the filtrate was free of color and the resulting filter cake was carefully washed and dried.

Example 29

In place of the acidic vinylic filler a basic vinylic filler was chosen to combine with the direct dye Solantine Yellow 4GL Conc. 125%.

To the high speed blendor was added 100 ml. of basic vinylic filler latex type I–G, containing 26.9% solids, 250 ml. of water, 10 grams of Solantine Yellow 4GL Conc. 125% dissolved in 200 ml. of water at 90° C. and after agitating 15 minutes a solution of 10 grams of zinc chloride in 200 ml. of water was added. On addition of the zinc chloride the color changed from orange-yellow to a greenish-yellow. The resulting vinylic pigment was filtered and the filtrate was free of color. The resulting filter cake was washed and dried.

Example 30

To the high speed blendor was added 100 ml. of vinylic filler latex type I–G, followed by 200 ml. of water and 5 grams of Calcoform Blue R Conc. dissolved in 100 ml. of 90° C. water. After agitating 5 minutes 4.8 ml. of 28% aqueous ammonia was added, then 13.5 grams of urea and 42.7 ml. of 36% formaldehyde. The mixture was agitated for 10 minutes, then 10 ml. of concentrated hydrochloric acid and 100 ml. of water were added and the mix further agitated for 20 minutes while steam was added through the steam tube and the temperature was raised to 95° C. The resulting vinylic pigment mix was diluted with an equal part of water, filtered, and washed. The resulting wet pulp has many uses.

These dyes contain primary amino groups in suitable positions so that such groups can be diazotized on the fiber and developed with coupling components such as resorcinol, beta naphthol, meta phenylenediamine, 1-phenyl-3 methyl-1-pyrazolone and the like.

In the following example an acid vinylic filler which has been chemically treated with propylene oxide is used as the base to fix the direct and development dye and to permit the diazotization and coupling of that dye thereon.

Example 31

To the high speed blendor was added 150 ml. of vinylic filler latex type II–D containing 14.9% solids, 10 grams of Diazine Scarlet A Conc. 200% dissolved in 200 ml. of water at 90° C., 250 grams of ice and agitated for 5 minutes, then was added 6 ml. of 37% hydrochloric acid and 0.7 gram of sodium nitrate dissolved in 10 ml. of water. At the end of 15 minutes the diazotization was complete and during this time ice was added to hold the temperature at 15° C. Then 2 grams of beta naphthol and 1 gram of potassium hydroxide was dissolved in 30 ml. of water at 90° C. and this solution was added to the blendor while agitating, and for 15 minutes the temperature was maintained at 15° C. with ice, then over the next half hour allowed to raise to 22° C. After another 30 minutes of agitation coupling was complete. A drop of the mix on filter paper showed no bleeding and a filtered sample developed no color in the filtrate. The red vinylic pigment was filtered, washed, and dried.

The following example shows that the direct and development dyes can be combined and fixed on a basic vinylic pigment.

Example 32

To the high speed blendor was added 200 ml. of basic vinylic filler latex type I–G with 26.9% solids content, 10 grams of Diazine Scarlet A Conc. 200% dissolved in 200 ml. of water at 90° C. and 5 ml. of triethanolamine. After agitating for 15 minutes 10 grams of aluminum chloride dissolved in 50 ml. of water was added and the red vinylic pigment was formed. The pigment was filtered and the filtrate showed no color bleeding, the filter cake was washed and the red vinylic pigment dried.

The following example illustrates that direct and development dyes can be combined with acidic vinylic fillers to form vinylic pigments.

Example 33

This example was prepared in quantity and manner exactly like the previous example except that in place of latex type I–G there was used 200 ml. of acidic vinylic filler latex type I–D and the aluminum chloride was increased to 15 grams. The vinylic pigment from Diazine Scarlet A Conc. 200% was filtered with filtrate showing no bleeding and this was followed by washing and drying.

The following examples illustrate that direct and development dyes can be made to chemically combine with the vinylic filler. The reaction employed here is the combination of a reactive primary amino group with the aldehyde group of the graft vinylic filler.

TABLE VI.—VINYLIC PIGMENTS FROM DIRECT AND DEVELOPMENT DYESTUFFS

| Example Number | Dyestuff | Supplier | Dyestuff Identification | Dyestuff Classification | V.F. Latex Identification | V.F. Latex Type |
|---|---|---|---|---|---|---|
| 31 | Diazine Scarlet A Conc. 200% | NAC | C.I. 324A | Dir. & Dev. | II–D | Acid Oxide. |
| 32 | do | NAC | C.I. 324A | Dir. & Dev. | I–G | Basic. |
| 33 | do | NAC | C.I. 324D | Dir. & Dev. | I–D | Acid. |
| 34 | Diazine Orange GR | NAC | AATCC-Pr. 173 | Dir. & Dev. | II–C | Acid Aldehyde. |
| 35 | Diazine Scarlet 2BL | NAC | AATCC-Pr. 79 | Dir. & Dev. | II–C | Do. |
| 36 | Developed Brilliant Green 3G | NAC | AATCC-Pr. 78 | Dir. & Dev. | II–C | Do. |
| 37 | Diazine Bordeaux 7B Conc. | NAC | AATCC-Pr. 77 | Dir. & Dev. | II–D | Acid Oxide. |
| 38 | Fuchsine SBP | NAC | C.I. 676 | Basic | II–C | Acid Aldehyde. |
| 39 | Bismarck Brown YX Conc. 192% | NAC | C.I. 331 | do | II–C | Do. |

(VI) VINYLIC PIGMENTS FROM DIRECT AND DEVELOPMENT DYESTUFFS

The following examples illustrate the formation of vinylic pigments from the direct and development dyes.

Example 34

To the high speed blendor was added 50 ml. of aldehyde vinylic filler latex type II–C containing 33.3% solids, 250 ml. of water and 3 grams of Diazine Orange GR dissolved in 100 ml. of water at 90° C. After agitating for 15 minutes there was no bleeding of color from a drop of the mix placed on filter paper. The vinylic filler contained acidic groups as well as aldehyde and I added 3 grams of barium chloride dissolved in 100 ml. of water and the mixture thickened and the color deepened. The yellow vinylic pigment was filtered, washed and dried.

The resulting brown pigment was diluted with equal parts of water, filtered, washed, and dried.

TABLE VII.—VINYLIC PIGMENTS FROM DIRECT DYESTUFFS FOR CELLULOSE ACETATE

| Example Number | Dyestuff | Supplier [1] | Dyestuff Identification | Dyestuff Classification | V.F. Latex Identification | V.F. Latex Type |
|---|---|---|---|---|---|---|
| 40 | Nacelan Fast Yellow CG | NAC | AATCC Pr. 2 | Dir. on Acet | II-B | Polar Acrylate. |
| 41 | Celanthrene Fast Blue GSS | DuP | | Dir. on Acet | II-B | Do. |
| 42 | Celanthrene Fast Pink 3B | DuP | AATCC Pr. 235 | Dir. on Acet | II-B | Do. |

[1] DuP = E. I. du Pont de Nemours & Co., Inc.

Example 35

To the high speed blendor was added 75 ml. of latex II–C, 300 ml. of water, 20 ml. of 10% caustic soda and 3 grams of Diazine Scarlet 2BL dissolved in 100 ml. of water at 90° C. The dye bled badly from the mixture by the drop test on filter paper until the mixture was heated to boiling by steam through the steam line and agitated 15 minutes, then no more color bleeding occurred.

To one-half of the mix was added 1.5 grams of barium chloride dissolved in 25 ml. of water. The products with and without addition of barium salt were filtered, washed and dried. The barium salt addition deepened the color of the red vinylic pigment.

Example 36

This example was prepared in a manner and quantities similar to the previous example except that in place of Diazine Scarlet 2BL there was added 3 grams of Developed Brilliant Green 3G and in place of forming the heavy metal salt of the vinylic pigment by barium chloride there was used 5 grams of aluminum chloride dissolved in 200 ml. of water. The deep blue vinylic pigment was filtered, washed, and dried.

To further illustrate the pigments which can be formed between dyestuffs and vinylic fillers a propylene oxide treated acidic vinylic filler was used to form the vinylic pigment with the direct and development dye chosen.

Example 37

To the high speed blendor was given 100 ml. of propylene oxide treated acidic vinylic filler type II–D, then 200 ml. of water and 4 grams of Diazine Bordeaux 7B Conc. dispersed in 200 ml. of water at 90° C. The mixture while agitating was heated by steam through the steam tube to about 100° C. and agitated for 30 minutes. The resulting dark wine-red vinylic pigment was filtered and the filtrate contained no color; the filter cake was washed and dried.

Basic dyes having a primary amino group can likewise be combined with vinylic fillers having aldehyde surface groups to form pigments.

Example 38

To the blendor was added 700 ml. of water at 90° C. and then 5 grams of Fuchsine SBP dyestuff and after the dyestuff dissolved was further added 200 ml. of aldehyde vinylic filler latex type II–C containing 33.3% dry solids. After rapidly blending for 5 minutes in the blendor a dark purple vinylic pigment resulted. This pigment suspension was diluted with equal parts of water, filtered, washed and dried. The chemical coupling between the dyestuff and the vinylic filler deepened the shade of the dyestuff and yielded a non-bleeding vinylic pigment.

Example 39

In a manner similar to the previous example, 5 grams of Bismarck Brown YX Conc. 192% was dissolved in 500 ml. of water at 90° C. and with rapid agitation in the blendor the aldehyde vinylic filler latex type II–C was added until complete removal of the dyestuff from the water resulted and this required 220 ml. of the vinylic filler latex.

(VII) VINYLIC PIGMENTS FROM DIRECT DYESTUFFS FOR CELLULOSE ACETATE

The examples given hereafter illustrate how direct dyes for cellulose acetate can be combined with vinylic fillers especially graft vinylic fillers to foam valuable vinylic pigments.

Because of the insolubility of the vinylic fillers it is quite unexpected that such particles would form fixed pigments with direct acetate dyes. While many of the other classes of dyestuffs combine with vinylic fillers with complete utilization of the dye added at room temperature or at slightly elevated temperature; boiling of the aqueous direct acetate dye dispersion with the aqueous dispersion of the vinylic particles is usually required.

I will have shown by this invention that complete adsorption of direct acetate dyes by vinylic fillers, especially graft vinylic fillers, is possible. This fact leads to the conclusion verified experimentally that other classes of dyes which combine with vinylic fillers, because of bonding accomplished by forming salts, by hydrogen bonding and by chemical bonding, can also be combined with graft vinylic fillers providing the core or graft has the appropriate chemical groups to accomplish such bonding. Vinylic fillers can be made with groups such as: acid, basic, groups capable of hydrogen bonding and chemically reactive groups; and then such vinylic filler cores can be grafted with polymeric material containing polar nitrogen, oxygen, halogen and sulfur groups and at least a part of such organic polymeric material can compose the graft. When such graft are not cross-linked and the direct dyestuff for cellulose acetate will, with the aid of heat and agitating, diffuse within the graft coating and even be held by hydrogen bonding to the graft or to the core material providing donor and acceptor groups are present in the vinylic filler and in the dyestuff.

Thus, the broad application of vinylic fillers for the purpose of this invention includes not only non-grafted but also non-cross-linked grafts on cross-linked vinylic filler core material.

When a vinylic filler is used having a graft containing aldehyde groups derived from such monomers as acrolein, methacrolein, crotonaldehyde, etc., and after the dye, such as a direct acetate dye, has been adsorbed, the resulting vinylic pigment can be further grafted by using urea, phenol, resorcinol and other materials which can form graft condensation resins with the aldehyde groups of the graft vinylic pigment. Thus by this aftertreatment with a combination forming a condensation product the direct acetate dye is locked onto the vinylic pigment particle.

The vinylic fillers used with the direct acetate dyes in the following examples are vinylic fillers without active polar groups in the core material and the graft is a non-crosslinked graft containing oxygen. Furthermore, the procedures given provide a method of forming vinylic pigments from direct acetate dyes whereby all of the dyestuff utilized is taken up by the vinylic filler particles.

Example 40

To the blendor was added 100 ml. of vinylic filler latex type I–B containing 32.4% solids, 250 ml. of water and 5 grams of Nacelan Fast Yellow CG dispersed in 100 ml. of water at 90° C. The dyestuff and vinylic filler latex was then mixed in the Waring Blendor. The pigment color only began to develop when the temperature was raised to 100° C. by running steam into the mixture by the steam tube. After 30 minutes of beating and blending, the pigment color was fully developed and a drop of the mix on filter paper no longer showed any color bleeding. The resulting yellow pigment was filtered and washed free of soluble salts and then dried.

Example 41

In a manner similar to the preceding example, there was given to the blendor 100 ml. of vinylic filler type II–B latex, 500 ml. of water and 5 grams of Celanthrene Fast Blue GSS. The mixture was agitated and heated by adding steam through the steam tube to elevate the temperature to about 100° C. After 30 minutes the vinylic pigment had developed and a test drop of the mixture on filter paper showed no color bleeding. Then 10 ml. of 90% formic acid was added and the deep blue pigment was filtered, washed and dried.

Example 42

In this example the vinylic pigment was prepared exactly in manner and quantity as was the previous example except in place of the Celanthrene Fast Blue GSS was used 5 grams of Celanthrene Fast Pink 3B. The resulting pigment was of a wine, purple, red color and showed no color bleeding on filtering and washing. The resulting vinylic pigment from this direct acetate dyestuff was dried. All of these pigments like the other examples of vinylic pigments are easily powdered and require no grinding as these pigment particles are of colloidal size.

These examples are not meant to be restrictive but are illustrative that vinylic pigments can be formed from direct acetate dyes and vinylic fillers especially graft vinylic fillers.

the vinylic filler is completely insoluble, the azo color will form on the surface of the vinylic filler, yielding vinylic pigment particles of colloidal size.

The field of azo colors is very broad; however, the following examples should illustrate the methods employed in this invention to obtain vinylic pigments and one skilled in the art of making and utilizing azo dyestuffs will readily comprehend the numerous other combinations. Thus, the examples here as elsewhere in this description are meant to be illustrative and are not to be construed as limiting.

The following examples illustrate the diazotization of p-nitroaniline and the coupling with b-naphthol to form Para Red in the presence of a vinylic filler.

Example 43

To the blendor was added 7 grams of p-nitroaniline, 200 ml. of cold water and 20 ml. of 37% HCl. As soon as a solution formed, with the aid of the blendor, then 100 ml. of vinylic filler latex type I–D containing 26.4% solids was added. Even though the latex was acidified and thickened sufficient water was present to obtain a fluid mix. To this mix was added 300 grams of ice and the temperature dropped to 0° C. with ice still present. Then 6 ml. of glacial acetic acid was added and further 3.5 grams of sodium nitrite dissolved in 20 ml. of water. Because of the excellent agitation the diazotization took place rapidly and was completed in about 15 minutes. A solution was prepared of 7 grams of beta-naphthol, 5 grams of caustic soda, and 100 ml. of water, and this solution was added to the water dispersion of vinylic filler particles partially coated with the diazo compound. Ice was added from time to time holding the coupling

TABLE VIII.—VINYLIC PIGMENTS FROM AZO COLORS

| Example Number | Dyestuff | Supplier | Dyestuff Identification | Dyestuff Classification | V.F. Latex Identification | V.F. Latex Type |
|---|---|---|---|---|---|---|
| 43 | Para Red | | Schultz 60 | Pigment | I–D | Acid. |
| 44 | Lithol Red R | | Schultz 219 | Lakes | I–B | Neutral. |
| 45 | Diazone Scarlet A Conc. 200% | NAC | C.I. 324A | Dir. & Dev | I–B | Do. |
| 46 | Scarlet RS | NAC | C.I. 118 | Insoluble Azo | I–D | Acid. |
| 46 | Naphthol AS–SW | NAC | AATCC-Pr. 313 | Prepare | I–D | Do. |
| 47 | Blue BN Salt | NAC | C.I. 499 | Insoluble Azo | I–D | Do. |
| 47 | Naphthol AS | NAC | AATCC-Pr. 302 | Prepare | I–D | Do. |
| 48 | Rapidogen Red GSB | G | AATCC-Pr. 168 | Insoluble Azo | I–G / I–D | Basic. / Acid. |
| 49 | Rapidogen Blue D | G | AATCC-Pr. 164 | do | I–G / I–D | Basic. / Acid. |
| 50 | Rapidogen Orange R | G | AATCC-Pr. 349 | do | I–G / I–D | Basic. / Acid. |
| 51 | Rapidogen Yellow GS | G | AATCC-Pr. 171 | do | I–G / I–D | Basic. / Acid. |

(VIII) VINYLIC PIGMENTS FROM AZO COLORS

The azoic colors and/or azo pigments even with groups such as the sulfonic acid group are insoluble colors principally of the yellow, orange, and red shades and are full, rich, brilliant colors. Many of the azo colors, such as Toluidine Red, Para Red, Permanent Orange, Benzidine Yellow, the pyrazolone pigments, etc., are extensively used in textile and paper printing today. In preparing these pigments special precautions are taken to obtain small particle sizes. The present invention provides a method of not only obtaining small particle size but also of obtaining vinylic pigments from azo colors in colloidal particle size. Further, the present invention provides an economical base upon which the color is formed. Further the vinylic filler base being transparent enables the full brilliancy of the color to be obtained. Further, not only are pigment properties obtained but likewise the reinforcing properties of the insoluble colloidal vinylic filler are preserved which enables such colors to be dispersed in solutions and added to regenerated, or synthetic fiber spinning solutions, and to other polymeric coatings where both color and reinforcement are desirable.

I have discovered that if azo colors formed from soluble materials to yield the insoluble azo colors are formed in the presence of vinylic filler particles, then even though temperature at about 5° C. for 30 minutes; then the temperature was allowed to rise to 45° C. over the next 30 minutes. From time to time a sample was taken and filtered and the filtrate observed to determine whether additional coupling was taking place. After another half-hour at a temperature of from 45 to 50° C. coupling was complete.

The following example illustrates the diazotization of Tobias acid and the coupling with beta naphthol in the presence of a vinylic filler consisting of styrene and divinylbenzene, to form an insoluble vinylic pigment.

Example 44

To the blendor was added 150 ml. of vinylic filler latex type I–B containing 26.8% solids, 200 ml. of water, a solution consisting of 7.4 grams of beta naphthol and 2.2 grams of caustic soda and 50 ml. of water, a solution of 8.6 grams of Tobias acid and 2.2 grams of caustic soda and 50 ml. of water, followed by 300 grams of ice to drop the temperature to 0° C. With high speed agitation 12.5 ml. of 37% hydrochloric acid and 2.5 ml. of glacial acetic acid was added and the temperature rose to 5° C. Then 3.5 grams of sodium nitrate were added; the color changed to yellow and the diazotization was allowed to proceed for 5 minutes; then 30 ml. of 10% sodium hydroxide was added and the color turned orange. Over a 15 minute period the temperature was allowed to rise to 40° C. and the color was still orange. Then a solution of 10 grams of barium chloride dissolved in 100 ml. of water and added and the color changed to deep orange. Rapid agitation was continued for 30 minutes during which time the temperature rose to 60° C. and the color deepened to a typical Lithol Red R shade. The resulting vinylic pigment was carefully filtered, reslurried in water and again filtered. Three filtrations and reslurryings removed the soluble salts and yielded an excellent red vinylic pigment pulp. The resulting vinylic pigment pulp can be used as a flushed color with or without the addition of oils, plasticizers, solvents, dispersants, and the like, or can be dried, thus yielding the solid vinylic pigment, which like the other examples, requires no grinding, but only a slight powdering to obtain the fluffy, fine pigment particles.

Observations under the microscope showed no single particles of the azo color, only clusters of the color coated vinylic filler particles which, being colloidal, are individually too small to be observed under the microscope.

To further illustrate the preparation of an azo dyestuff on a vinylic filler base a soluble azo dye was chosen with a diazotizable amino group, and this was diazotized and coupled to beta-naphthol in the presence of vinylic filler particles.

Example 45

In a manner and in amounts the same as in the previous example, this vinylic pigment was prepared, except that in place of p-nitroaniline 30 grams of Diazine Scarlet A Conc. 200% was dissolved in hot water and cooled. The resulting red vinylic pigment on filtering and washing showed no bleeding. For further examples of the diazo dyestuffs which can be applied to the formation of vinylic pigments see the section on Rosanthrene Diazo Dyes in Ciba Company, Inc., New York, N.Y., Bulletin 220, entitled, "Direct Chlorantine and Developed Dyes." The dyes noted therein are illustrative only and not restrictive of the development of azo dyes from which vinylic pigments can be prepared.

The next example is that of an amine which has been diazotized and a stabilizer added so that a stable diazonium salt results (Fast Salt) which can be coupled to a naphthol in the presence of vinylic filler particles, thus yielding the insoluble azo type color coated on the vinylic filler particles, referred to as a vinylic pigment.

Example 46

To the blendor was added 300 ml. of water, 10 ml. of dispersant Triton X–100 and 6.8 grams of Scarlet RS salt. The mixture was agitated until solution occurred. Then 100 ml. of vinyl filler latex type I–D containing 26.4% solids was added. The naphthol solution was prepared by then dissolving 2 grams of Naphthol AS–SW in 10 ml. of 10% caustic soda solution and 10 ml. of isopropanol. The naphthol solution was then added to the blendor mix and the speed of the mixer adjusted so in one half hour the temperature rose to 60° C. The mix was allowed to agitate for 30 minutes until the red color completely developed. The vinylic pigment dispersion was diluted with an equal volume of water and filtered, and the filter cake washed free of soluble matter. The resulting press cake was usable as a flush color or dried and used as a dry color.

Example 47

The preceding example was repeated, except that instead of Scarlet RS salt, there was used 8.7 grams of Blue BNS salt and in place of Naphthol AS–SW, 2 grams of Naphthol AS was used; there resulted a dark blue vinylic pigment.

For further combinations of the naphthols, refer to National Aniline Division, Bulletin 253, entitled, "National Naphthols on Cotton" (Allied Chemical & Dye Corps., New York, N.Y.) and such combinations can be used in the presence of vinylic type fillers to form vinylic pigments.

The next examples I have chosen represent the prepared stabilized combinations of naphthols and diazo bases and their reaction in the presence of vinylic fillers.

Example 48

To the blendor was added 100 ml. of vinylic filler latex type I–G containing 26.9% solids, and 100 ml. of vinylic filler latex type I–D containing 26.4% solids, followed by 600 ml. of water, and then with rapid agitation 15 grams of Rapidogen Red GSB was added, followed by 5 ml. of 90% formic acid and the pH of the mix was between 3 and 4. The mix was allowed to run for 15 minutes. Then the steam tube was opened and the mix was allowed to heat to 60° C. over the next hour and to 90° C. over the next half hour. The resultant red vinylic pigment dispersion was diluted with an equal volume of water and filtered, and the filter cake was washed free of soluble salts yielding a vinylic pigment wet cake useful for flushing, and after drying, a pigment.

Examples 49, 50, and 51

In a like manner vinylic pigments were prepared from Rapidogen Blue D, Rapidogen Orange R, and Rapidogen Yellow GS.

For the preparation of further vinylic pigments from azo dyes by the above method refer, for the dyestuffs, to the General Dyestuffs Corp., Bulletin GDC–291, entitled, "Rapidogen, Rapid Fast, and Algosol Dyestuffs Printed on Cotton Piece Goods" (New York, N.Y.).

After formation of the vinylic pigments from azoic colors an after such pigments have been washed free of soluble salts, such pigments can be reslurried in water on the basis of 100 grams of dry pigment to 400 ml. of water then 0.1 gram of caustic soda, 4.8 grams of 28% ammonia, 13.5 grams of urea and 42.7 ml. of 36% formaldehyde. After agitating for 15 minutes in the blendor the mix was acidified with hydrochloric acid and heated by steam through the steam tube to 90° C. and held for one hour with agitation and there resulted a vinylic pigment fixed by a urea type resin.

Thus, the vinylic pigments from azoic colors are coated with a condensation resin like urea-formaldehyde. Any of the water prepared condensation resins can be used for this purpose, for example phenol-resorcinol-formaldehyde resins.

Without curing the condensation resin I have shown that it can be used to bond vinylic pigments to fibers, woven goods, and many surface decorative applications.

The insoluble vinylic pigments from the azo colors are of such fine particle size that the colors are essentially transparent. If these azo pigments, such as Para Red and Lithol Red R, are prepared without a vinylic filler particle base then pigment colors having covering or hiding power can be obtained. I have found that a unique decorative effect can be obtained by first covering the object to be decorated with a vehicle containing an azo pigment, not prepared from a vinylic filler which will provide the covering power then further cover this base coat with a vehicle containing the same azo pigment prepared as a vinylic pigment. This combination of base coat with covering power and overcoat with transparency and both pigments having the same color gives an effect of depth of color. Mixed color effects can be obtained by using a base color with covering power such as, for example, a blue and a transparent overcoat of a complementary colored vinylic pigment such as a yellow to produce unique green effects.

TABLE IX.—VINYLIC PIGMENTS FROM METAL MORDANT DYESTUFFS

| Example Number | Dyestuff | Supplier | Dyestuff Identification | Dyestuff Classification | V.F. Latex Identification | V.F. Latex Type |
|---|---|---|---|---|---|---|
| 52 | Chrome Fast Red B | Ciba | C.I. 652 | Mordant Acid | I-G | Basic. |
| 53 | Chrome Fast Blue GBX | do | C.I. 720 | do | I-G | Do. |
| 54 | Chrome Fast Yellow ME | do | AATCC-Pr. 317 | do | I-G | Do. |
| 55 | Palatine Fast Violet 3RNA-CF | G | AATCC-Pr. 328 | Acid (Metal) | I-G | Do. |
| 56 | Palatine Fast Yellow 9RNA Extra CF | G | AATCC-Pr. 316 | do | I-G | Do. |
| 57 | Palatine Fast Orange RNA-CF | G | AATCC-Pr. 325 | do | I-G | Do. |
| 58 | Alizarine Red S | NAC | C.I. 1034 | Mordant Acid | I-D | Acid. |
| 59 | Alizarine Sapphire BN Conc. 150% | NAC | C.I. 1054 | Acid | I-G | Basic. |
| 60 | Alizarine Cyanine Green GX | NAC | C.I. 1078 | do | I-D | Acid. |

(IX) VINYLIC PIGMENTS FROM METAL MORDANT DYESTUFFS

The examples given in the following are to illustrate that vinylic fillers, especially those having on their surface acid, basic, hydroxyl and ester groups, can be used with metal mordant dyestuffs. The metals selected for such mordanting are chromium, iron, aluminum, tin, copper, cobalt, and the like. The metal mordant dyes capable of forming vinylic pigments when combined with suitable vinylic fillers are subclassified as (a) chrome mordant acid dyestuffs; (b) acid (metal) dyestuffs; (c) anthraquinone mordant dyestuffs; and (d) anthraquinone dyestuffs (acid type).

Thus, in spite of the insolubility of the vinylic filler particles, this invention teaches that vinylic pigments can be formed from these fillers and the metal mordant type dyestuffs.

When vinylic pigments are formed with the chromed dyestuffs then the vinylic filler such as the vinylpyridine type filler can be either prechromed and complexed with the dyestuff; or can be after-chromed following the dyestuff addition to the vinylic filler latex, or the vinylic filler can be combined directly with the chromium complex of the dyestuff to form the vinylic pigment.

(A) VINYLIC PIGMENTS FROM CHROMED MORDANT ACID DYESTUFFS

Example 52

To the Waring Blendor was added 200 ml. of vinylic filler latex type I-G containing 26.9% dry solids, 200 ml. of 2% sodium dichromate, 5 grams of Chrome Fast Red B dissolved in 100 ml. of water at 90° C. temperature. After thoroughly agitating for 5 minutes there was added 30 ml. of 10% sulfuric acid, and the mix was agitated for another 5 minutes then heated to boiling for 15 minutes. The resulting vinylic pigment was diluted with 300 ml. of water and filtered, washed thoroughly and dried. No bleeding of the red color was noticed during filtering.

Example 53

In this example the vinylic filler latex was pre-chromed, dyed, and treated with aluminum salts.

To 200 ml. of vinylic filler latex type I-G containing surface vinylpyridine groups, was added 400 ml. of water, 2 ml. of triethanolamine and 4 grams of sodium bichromate. During agitation for 5 minutes in the blendor the latex became more viscous and yellow in color indicating the chromium salts probably complexed with the pyridine groups of the vinylic filler. To this chromed vinylic filler latex was added 100 ml. of 10% solution of Chrome Fast Blue GBX Conc. dyestuff and during the period it was being agitated in the blendor a steam line provided heat to raise the temperature to 95° C. for 10 minutes. Then 50 ml. of 10% aluminum chloride solution was added and the heating continued for another 10 minutes. The resulting lake was diluted with equal parts of water and the color did not bleed on filtering. The lake was carefully washed and filtered resulting in a bright blue product.

Example 54

To 200 ml. of vinylic filler latex containing vinylpyridine groups, type I-G of 26.9% solids content, were added 400 ml. of water, 5 grams of sodium dichromate and 2 ml. of triethanolamine. These ingredients were in the blendor for 5 minutes. A filtered solution of 10 grams of Chrome Fast Yellow ME in 200 ml. of water at 60° C. was added to this pretreated latex while agitating in the blendor. This was followed by 4 ml. of 90% formic acid which thickened the latex and prevented the lake from bleeding. This suspension was thinned with an equal volume of water and boiled for 30 minutes. The vinylic filler pigment was filtered off carefully, washed free of soluble salts and acid, and dried. A yellow vinylic filler pigment resulted.

(B) VINYLIC PIGMENTS FROM ACID (METAL) DYESTUFFS

The Palatine dyes were chosen to illustrate that vinylic pigments can be formed by combining vinylic fillers and soluble chromium complexes of mordant azo dyes.

Example 55

To 400 ml. of vinylic filler latex containing pyridine groups and designated as latex type I-G of 26.9% solids content was added 500 ml. of water and 2 grams of sodium bichromate and the mixture was mixed. To this was added 10 grams of Palatine Fast Violet 3RNA-CF dissolved in 100 ml. of water at 60° C. Then 7 ml. of 90% formic acid was added and the thickened mass was blended for 10 minutes in the blendor, and thereafter was diluted with an equal volume of water and boiled for 30 minutes, resulting in the vinylic pigment. During the washing and drying, the dyestuff did not bleed. A purple vinylic pigment was formed.

Example 56

In a manner of preparation similar to the previous example, a yellow vinylic pigment was formed, except that no sodium bichromate was used and the dye used in this example was 10 grams of Palatine Fast Yellow GRNA Ex. CF. Like the previous example, there was obtained after acidifying with 5 grams of 90% formic acid, diluting and boiling, washing, filtering and drying, a non-bleeding yellow vinylic pigment.

Example 57

In this example an orange vinylic pigment was prepared in a manner and procedure similar to the previous example, except that 2 ml. of triethanolamine was added to the vinylic filler latex, the dye was 12 grams of Palatine Fast Orange RNA-CF and the mix was acidified with 10 grams of 90% formic acid and boiled. On filtering and washing the orange vinylic pigment did not bleed color to the water.

(C) VINYLIC PIGMENTS FROM ANTHRAQUINONE MORDANT DYESTUFFS (MORDANT ACID)

Example 58

To the blendor was added 200 ml. of vinylic filler latex containing surface carboxylic groups designated as type I-D latex having a 26.4% solids content. Following was added 10 grams of Alizarine Red S dissolved in 200 ml. of water at 50° C. containing 3 grams of caustic soda. Then was added 4 grams of aluminum acetate, 4.7 grams of calcium acetate 5.7 grams of stannous chloride, and 10 grams of sodium sulfite, each dissolved in 50 ml. of water. After stirring for 5 minutes in the Waring Blendor, 3 ml. of 90% formic acid was added, followed by 3 grams of oxalic acid added dry to the mix while agitating in the blendor. The steam tube was introduced into the Waring Blendor and the agitating mass heated to 95° C. for 5 minutes. Thereafter the mass was diluted with an equal volume of water, filtered and washed carefully to remove all salts. The red Alizarine vinylic pigment lake was dried. Depending on the color depth and shade desired, many variations can be applied to the recipe given to produce the desired vinylic pigment.

(D) VINYLIC PIGMENTS FROM ANTHRAQUINONE DYESTUFFS (ACID TYPE)

Example 59

In the Waring Blendor was added 100 ml. of vinylic filler type I-G of 26.9% solids and 100 ml. of vinylic filler type I-D 26.4% solids and 100 ml. of water at 55° C. A solution of 7.5 grams of Alizarine Sapphire BN Conc. 150% dissolved in 100 ml. of water at 95° C. was added to the vinylic filler latex agitating in the Waring Blendor, and to this was added 4 grams of barium chloride dissolved in 40 ml. of water. The resultant blue lake did not bleed color during a filtering and thorough washing. The blue vinylic pigment was then dried. Instead of the barium chloride solution I sometimes prefer to add 4 grams of aluminum acetate or chloride with or without 4.7 grams of calcium acetate or chloride.

Example 60

To the Waring Blendor was added 200 ml. of vinylic filler containing free carboxyl groups designated as type I-D latex and 400 ml. of water at 55° C. Then was added 15 grams of Alizarine Cyanine Green GX and 2 grams of caustic soda dissolved in 150 ml. of water at 95° C. To this further was added 10 grams of aluminum chloride and 10 grams of calcium chloride dissolved in 150 ml. of water at 55° C. The thickened mass was agitated for 10 minutes while the steam tube was introduced and the temperature raised to 95° C. The mix was then diluted with equal parts of water, filtered, washed thoroughly, and dried. During the washing operation the green vinylic pigment did not bleed color.

The examples given of the formation of vinylic pigments from vinylic fillers and mordant dyestuffs is meant to be illustrative and not restrictive and one skilled in the art will appreciate by the teachings herein that many variations can be made in forming vinylic pigments from vinylic fillers including grafted vinylic fillers and the metal mordant dyestuffs.

dispersed form. A certain amount of improvement attended the use of this method, but, with a few exceptions, the products were still deficient in both brilliance and strength."

In a more recent authoritative work entitled, "The Application of Vat Dyes, Monograph No. 2," published in 1953 by a board of editors from the American Association of Textile Chemists and Colorists, there is a very short six-page (chapter XIII) discussion of the uses of vat dyes as pigments. Again one is impressed that with a few exceptions the vat dyes have only to a limited degree entered the pigment field. On p. 255 of this book (chapter VIII) a very significant predication is made and I quote:

"Another possible textile use for the pigment form (of vat dyes), which may acquire greater importance in the future is for the mass dyeing of viscose and other regenerated or synthetic fibers before they are spun into yarns, or before formation as a film."

The present invention provides the means of preparing colloidal particle size vinylic pigments from vat colors and vinylic fillers with excellent color strength and not least of all at a lower cost. Thus, through this discovery vat colors in variety will be able to enter the pigment field. Further, this invention provides a line of vinylic pigments excellently suited for the pigmenting of both regenerated and synthetic spinning and film forming solutions, dopes, and viscous masses.

Numerous vat dyes are given in the AATCC book, "The Application of Vat Dyes," and especially in chapter XIII, and I have found these vat dyes and their applications to be more advantageously accomplished through this invention.

The following examples are typical of the manner in which vat dyes can be developed on the surface of vinylic fillers to give particles of colloidal fineness with excellent development of full color. The examples are not meant to be restrictive, but illustrative, as, for example, oxidation was quickly obtained using potassium persulfate as chemical agent. Of course, other oxidizing agents can be used, including atmospheric oxygen. In preparing the leuco compound du Pont's sodium hydrosulfite was used; however, other reductants can likewise be used such as, for example, Rongalite, the addition product of sodium hydrosulfite and formaldehyde.

Example 61

The Waring Blendor used for these experiments has a large capacity bowl and is fitted with a rheostat so that the cutting and stirring blade can be rotated from scarcely moving to 18,000 r.p.m. Thus, the vat dyes can be sol-

TABLE X.—VINYLIC PIGMENTS FROM VAT DYES

| Example Number | Dyestuff | Supplier [1] | Dyestuff Identification | Dyestuff Classification | V.F. Latex Identification | V.F. Latex Type |
|---|---|---|---|---|---|---|
| 61 | Carbanthrene Ptg. Blue GCD Dble. Pdr | NAC | C.I. 1112 | Vat | I-B | Neutral. |
| 62 | do | NAC | C.I. 1112 | Vat | I-D | Acid. |
| 63 | do | NAC | C.I. 1112 | Vat | I-G | Basic. |
| 64 | do | NAC | C.I. 1112 | Vat | I-A | Aldehyde. |
| 65 | Carbanthrene Red BN Dble. Flakes | NAC | C.I. 1162 | Vat | I-G | Basic. |
| 66 | do | NAC | C.I. 1162 | Vat | I-D | Acid. |
| 67 | Brilliant Indiago 4BR Flakes | NAC | C.I. 1184 | Vat | {I-G, I-D} | Basic. Acid. |
| 68 | Amanthosol Flavone GC | AAP | AATCC-Pr. 9 | Leuco Vat. Est | I-D | Do. |
| 69 | Amanthosol Pink I.R | AAP | AATCC-Pr. 109 | do | I-D | Do. |

[1] AAP = American Aniline Products, Inc.

(X) VINYLIC PIGMENTS FROM VAT DYES

Lyde S. Pratt in his book entitled, "The Chemistry and Physics of Organic Pigments," published in 1947 by John Wiley & Sons, Inc., New York; on pp. 212 and 213 makes the following statement regarding vat pigments:

"For many years the possible value of these materials (vat dyes) in the pigment field has been recognized, and many attempts have been made to eliminate their usual deficiencies. One of the first methods tried involved reduction to the leuco form and subsequent reoxidation under a variety of conditions, to the color in a more highly ubilized by converting to their leuco form without fear of atmospheric oxidation caused by whipping air into the mix.

In the Waring Blendor was given 400 ml. of water, 10 grams of caustic soda, 10 grams of sodium hydrosulfite, and 10 grams of the Indanthrene Blue designated as Carbanthrene Ptg. Blue GCD Dbl. Pdr. During 10 minutes the dyes reduced to the leuco form while stirring very slowly and by means of the steam tube, slowly raising the temperature to 60° C. Then was added 100 ml. of a neutral vinylic filler type I-B of 26.8% solids content, The speed of the blendor was now increased to several thousand r.p.m. and allowed to run for 10 minutes. The leuco vat dye in the presence of the vinylic filler latex was now oxidized by adding to the mix in the Waring Blendor 10 grams of potassium persulfate. The oxidation was carried out with excellent agitation and in another 10 minutes the product was completely oxidized for the filtrate of a sample is colorless. The vinylic pigment suspension was diluted with an equal volume of water and filtered, and the filter cake carefully washed until all water soluble salts were removed. The product is either utilized as a wet pulp or dried to a powder that can be redispersed in a solvent mixture as a colloidal suspension suitable for addition to regenerated or synthetic fiber spinning solution or dopes, or for solvent preparation of protective or decorative coatings, and other applications to natural and synthetic high polymers.

Example 62

In place of the neutral vinylic filler an acid vinylic filler is used and the dye prepared according to the preceding example. Alternately, in this case, the vinylic filler can be surfaced with a heavy metal salt which will in some cases effect the shade.

For example, to 100 grams of vinylic filler containing free carboxylic groups designated as I-D with 26.4% solids, was added 5 grams of caustic soda and 400 ml. of water in the Waring Blendor, and then 7 grams of aluminum chloride and 7 grams of calcium chloride each dissolved in 50 ml. of water were added. The latex thickened, but experience had shown that this in no way prevented the leuco vat dye from being oxidized on the surface of these vinylic filler particles.

The leuco dye of the Indanthrene Blue was prepared in the same manner as the previous example, and this heavy metal salted vinylic filler latex was added thereto and the mix oxidized to the insoluble vinylic pigment coated with insoluble vat dyestuff.

Microscopic studies have shown that vinylic pigments formed according to this invention are colored vinylic particles and that there are no distinguishable areas of color formed apart from the vinylic filler particles, nor are there any uncolored areas of vinylic particles discernible.

Example 63

The first example of a vinylic pigment from Carbanthrene Ptg. Blue GCD Dble. Pdr. was prepared according to Example 58, except that a basic vinylic filler latex designated as type I-G containing 26.9% solids was used in place of type I-D.

Example 64

This example was the same as the preceding example, except that a graft vinylic type I-A with 25.7% solids was used in place of type I-G vinylic filler latex.

Example 65

To the Waring Blendor was added 400 ml. of water, 10 grams of caustic soda, 10 grams of sodium hydrosulfite, 10 grams of Carbanthrene Red BN Dble. Flakes, and then with very slow agitation the mix was heated by the steam tube and at 45° C. a clear blue solution was formed. To this leuco dye solution was added 100 ml. of vinylic filler latex type I-G of 26.9% solids, and for 5 minutes this was rapidly agitated in the Waring Blendor. Then 10 grams of potassium persulfate were added and the color changed from blue to red. After 10 minutes of agitation a sample was tested for bleeding and the filtrate was clear, indicating all the leuco dye was converted to the insoluble vat form on the surface of the vinylic filler particles. The mix was diluted with an equal part of water, filtered, and the filter cake was washed free of soluble salts and was ready for use in the wet cake form or was further dried to the dry vinylic pigment.

Example 66

This example was prepared in the same manner as the preceding example, except acidic vinylic filler latex type I-D of 26.4% solids was used in place of I-G vinylic filler latex.

Example 67

This example was made in the same manner as Example 62, except that the vinylic filler latex was a blend of 100 ml. of type I-G and 100 ml. of type I-D vinylic filler latex. Further, the vat dye used was 10 grams of Brilliant Indigo 4BR Flakes; upon adding the potassium persulfate the color changed from yellow to blue. During the oxidation of the leuco dye the mix thickened so that an extra 100 ml. of water had to be added. After filtering, washing and drying there resulted a blue vinylic pigment.

(A) VINYLIC FILLER PIGMENTS FROM LEUCO ESTERS OF VAT DYES

I have found that vinylic fillers in spite of their insolubility can be dyed with leuco esters of vat dyestuffs. For example, in AATCC's book entitled, "The Application of Vat Dyes," the excellent chapter XIV entitled, "Leuco Esters of Vat Dyestuffs," gives the various methods of handling the leuco esters of vat dyes and such information is applicable to the fixing of such dyestuffs on vinylic type fillers.

Example 68

To the Waring Blendor was added 400 ml. of water, and then 10 grams of caustic soda, 10 grams of Amanthosol Flavone GC dissolved in 100 ml. of water at 90° C. and 100 ml. of acidic vinylic filler latex type I-D with 26.4% solids. The Waring Blendor was run at high speed and in 3 minutes a yellow color resulted and the mix was heated to 95° C. by steam from the steam line to the blendor. Six grams of potassium persulfate were added and after 10 minutes the color changed to a mustard shade. After running 15 minutes at 90° C. the soluble dye was exhausted from the water, being all converted from the leuco ester to the insoluble vat form. The mix was cooled, diluted with an equal part of water and filtered. The press cake, after filtering, was washed free of soluble salts and dried yielding the yellow vinylic pigment.

Example 69

This was prepared in the same manner as the preceding example, except the leuco vat dye was 10 grams of Amanthosol Pink IR. During oxidation the leuco dye changed from white to yellow to strawberry color. Before diluting, filtering and washing the vinylic pigment, 50 ml. of 20% calcium chloride solution was added to the mix. Complete exhaustion of the color from the aqueous medium took place for there was no color in the wash water.

TABLE XI.—VINYLIC PIGMENTS FROM SULFUR DYES

| Example Number | Dyestuff | Supplier | Dyestuff Identification | Dyestuff Classification | V.F. Latex Identification | V.F. Latex Type |
|---|---|---|---|---|---|---|
| 70 | Sulfur Bordeaux BCF Conc. 125% | NAC | C.I. 1012 | Sulfur | I-D | Acid. |
| 71 | Sulfur Green BCF | NAC | C.I. 1006 | do | I-D | Do. |
| 72 | Sulfur Dark Brown R Conc. 125% | NAC | | do | I-D | Do. |
| 73 | do | NAC | | do | II-E | Acid Graft Sulfur. |

(XI) VINYLIC PIGMENTS FROM SULFUR DYES

The dyestuffs known as sulfur colors are usually prepared by heating various organic bodies with sulfur, alone or with sodium sulfide. These colors are applied like the vat dyes. In their reduced form or leuco compound, the sulfur dyes are water soluble and can be combined with vinylic filler latices to form on oxidation the insoluble vinylic pigment. These pigments have in general good light fastness.

Example 70

To the Waring Blendor was added 400 ml. of water, then 10 grams of sodium hydoxide and 10 grams of Sulfur Bordeaux BCF Conc. 125%. After heating with the steam tube to 60° C. the dye was in solution. Agitation was very slow to prevent excessive oxidation. To the dye solution was added 100 ml. of acidic vinylic filler latex type I–D of 26.4% solids. The Waring Blendor mixing was speeded up and after 5 minutes 110 ml. of 10% sulfuric acid solution were added. On addition of the acid the color changed from brown to red-purple and on filtering a sample, it was found that the filtrate was free of dye. With good agitation the mix was heated to 90° C. by the steam tube and held for 10 minutes at this temperature. The color was diluted with an equal volume of water, filtered, and the filter cake thoroughly washed and dried.

Example 71

In a manner similar to the preceding example, a dark blue vinylic pigment was prepared using 10 grams of Sulfur Green BCF. To the vinylic pigment before removal from the Waring Blendor, filtering and washing, was added 8 grams of calcium (dry) chloride dissolved in 50 grams of water. On filtering and washing, this vinylic pigment did not bleed color.

Example 72

This example was prepared in a manner similar to the two preceding examples, except that the sulfur dye used was Sulfur Dark Brown R and in this preparation no calcium chloride was added. The oxidation was a little slower, so an additional 20 minutes of agitation was given the mix in the Waring Blendor. At high speeds the blendor incorporates considerable air which aids the oxidation. The resulting vinylic pigment was filtered, washed and dried.

If the sulfur dyes, as supplied by the manufacturer, are not soluble in caustic soda, then sodium sulfide, Rongalite, or a suitable reducing agent must be added to produce the leuco derivative before oxidation is undertaken by air or the aid of a chemical oxidant like hydrogen peroxide, sodium perborate or potassium persulfate and the like.

Vinylic fillers containing no active groups may be used; however, excellent results are obtained with the basic, aldehydo, keto, and sulfur-containing, for example, mercapto vinylic fillers. Thus, the wide application of vinylic fillers in the preparation of new vinylic pigments can be appreciated by one skilled in the art of producing and utilizing sulfur dyes.

Example 73

Vinylic filler latex type II–E was prepared by charging a bottle with 690 ml. of vinylic filler type I–F and 20 grams of butadiene, 0.85 gram of dodecylmercaptan, 0.5 gram of azobis(isobutyronitrile) and polymerizing at 60° C. for 12 hours. To the styrene-divinylbenzene vinylic filler latex grafted with butadiene was added 8.25 grams of butyl mercaptan and 0.1 gram of ammonium persulfate and the bottle containing the material was then placed in an oven for 14 hours at 80° C. The mercaptan added to the unsaturated graft, forming a sulfur-containing graft vinylic filler latex designated as latex type II–E.

To the Waring Blendor was given 150 ml. of latex type II–E, 300 ml. of water, 50 ml. of 10% caustic soda solution, 5 grams of Sulfur Dark Brown R Conc. 125% dissolved in 100 ml. of water at 90° C. After agitating for 10 minutes, the temperature was then increased by steam from the steam tube to 95° C. and held for 20 minutes while rapidly agitating. The vinylic pigment was acidified with dilute sulfuric acid diluted with an equal volume of water, filtered and washed free of soluble salts and dried, thus yielding the vinylic pigment.

(XII) VINYLIC PIGMENTS AS REINFORCING FILLERS

A blue vinylic pigment dispersed in GR–S 1500 rubber was prepared as follows:

Carbanthrene Printing Blue GR Double Paste to the extent of 60 grams was reduced by adding 100 ml. of water, 20 grams of sodium hydrosulfite and 20 grams of sodium hydroxide. After heating over a period of 5 minutes to 90° C., the leuco dye solution was placed in the high speed blendor and 430 grams of acidic vinylic filler latex was added, which was prepared according to Recipe F, Table II. While the material was agitating in the high speed blendor there was added 20 grams of potassium persulfate and the agitation was continued for 10 minutes. The vinylic pigment mix was diluted with twice the volume of water and filtered. The blue vinylic pigment filter cake was returned to the high speed blendor and 2765 grams of GR–S 1500 latex (20% total solids) was added. This was thoroughly mixed and coagulated with 100 ml. of saturated salt solution followed by the addition of 1.5% sulfuric acid until the pH was 4.0 and the resulting crumb was filtered, water washed, and dried.

Table XII compares GR–S 1500 gum stock, GR–S 1500 plus a vinylic filler, and GR–S 1500 plus the same vinylic filler converted to a vinylic pigment and the results illustrate the fact that the vinylic type fillers, when converted to vinylic pigments, still are effectual in reinforcing elastic and plastic materials.

TABLE XII.—VINYLIC PIGMENTS AS REINFORCING FILLERS

| Example No. XII | Control | Comparison | -1 |
| --- | --- | --- | --- |
| Elastomer Latex (dry basis): GR–S 1500, Quantity | 100 | 100 | 100 |
| Vinylic Filler Latex (dry basis): Quantity Composition | | 20 | 20 |
| Polymerization Step I: | | | |
| Styrene | | 80 | 80 |
| Methacrylic Acid | | 10 | 10 |
| Divinylbenzene | | 10 | 10 |
| Polymerization Receipe (Table I) | | F | F |
| Dyestuff Fixation Step II: Carbanthrene Printing Blue GR Double Paste* | | | 60 |
| Compound: | | | |
| Recipe | A | B | B |
| N-sub.-alpha-aminopropionitrile | | 1 | 1 |
| Compound Mooney Viscosity, ML–4 | 37 | 44 | 48 |
| Cure, minutes at 285° F | 90 | 45 | 120 |
| Test Results: | | | |
| Elongation, Percent | 320 | 825 | 775 |
| Modulus, 300% | 160 | 285 | 315 |
| Hardness, Shore A Durometer | 39 | 64 | 67 |
| Tensile Strength, p.s.i | 215 | 3,150 | 3,320 |
| Percent Increase in Tensile Strength | | 1,365 | 1,444 |

*Dyestuff reduced at 90° C. with 20 parts sodium hydrosulfite and 2 parts sodium hydroxide with 100 parts water and then in presence o the vinylic filler oxidized with 20 parts potassium persulfate.
Compound Recipe A: 3 pts. zinc oxide, 1 pt. stearic acid, 1 pt. benzothiazyl disulfide, 0.5 pts. 2-mercaptobenzothiazole, 2.5 pts. sulfur.
Compound Recipe B: 3 pts. zince oxide, 1 pt. AgeRite Resin D (polymerized trimethyldihydroquinoline), 1 pt. stearic acid, 1 pt. N-cyclohexyl-2-benzothiazole sulfenamide, 2.5 pts. sulfur.

(XIII) VINYLIC PIGMENTS WITH INORGANIC PIGMENTATION

I have discovered that vinylic pigments can be prepared having pigmentation of inorganic origin and the following examples illustrate the fact that inorganic pigments, which are capable of being prepared by precipitation in or into an aqueous medium, can be employed to pigment vinylic fillers yielding vinylic pigments.

The preparation of graft formed vinylic filler latex used in the following examples is hereinafter described.

The polymeric emulsifier was prepared by polymerizing 70 grams of styrene, 80 grams of maleic anhydride in 1300 grams of benzene using 2.25 grams of benzoyl peroxide as catalyst and 1.5 grams of tert.-dodecyl mercaptan as modifier. The polymerization was carried out over a 3 hour period at the reflux temperature of benzene. The copolymer as a white powder was filtered from the benzene and dried. With this polymeric emulsifier graft formed vinylic fillers were prepared as exemplified by the following recipe:

Accordingly this recipe was charged to a pressure bottle; 10 grams maleic anhydride-styrene copolymer prepared as heretofore described was dissolved in 620 ml. of water containing 14.5 ml. of 28% aqueous ammonia and 0.5 gram of lauryl sodium sulfonate (Duponol ME). To this solution was added 85 grams of styrene, 15 grams of ethyleneglycoldimethacrylate and as catalyst; 1 gram of ammonium persulfate and 0.5 gram of sodium hydrogen sulfite. The polymerization was carried out at 60° C. for 12 hours and the conversion of the monomers to polymer was complete. This graft formed vinylic filler latex was used in the following Examples 74 to 78.

While only a single type of vinylic filler was used in the following examples as the basis for forming the vinylic pigments with inorganic pigmentation, it is understood that any of the vinylic and graft vinylic fillers can be used. It is cautioned that in forming a pigment like the vinylic cadmium orange pigment it is important that the vinylic fillers be prepared from recipes free of iron or any other heavy metal salts capable of forming dark sulfides which would contaminate the orange color of the cadmium sulfide vinylic pigment.

Example 74

In this example a vinylic filler is pigmented with lead chromate.

To the high speed blendor was added 100 ml. of that graft formed vinylic filler latex prepared as heretofore described and such latex had been heated to 95° C. First, a solution was prepared by adding 30.4 grams of lead acetate to 160 ml. of boiling water and this was added to the latex followed by a solution consisting of 12 grams of potassium bichromate dissolved in 160 ml. of boiling water. During the addition of the lead acetate solution to the vinylic filler latex the latex thickened and the agitation was continued for 2 minutes and then potassium bichromate solution was added and agitation continued for 15 minutes. The golden yellow vinylic pigment was filtered and the filter cake was redispersed in 500 ml. of water and again filtered. The resulting filter cake can be employed as such or can be combined with an oil base as a flush color or the moisture can be removed from the filter cake forming the dry vinylic chrome yellow pigment.

By variation of the ratios of constituents, concentration, temperature, etc., the shade of the chrome yellow can be varied as will be appreciated by one skilled in the art of preparing inorganic pigments such as the chrome yellow color herein exemplified.

Example 75

In this example a vinylic filler is pigmented with cadmium sulfide.

In the high speed blendor was added 100 ml. of the vinylic filler latex prepared as heretofore described and 100 ml. of water. With good agitation was added 17 grams of cadmium nitrate dissolved in 50 ml. of water followed by 5 ml. of glacial acetic acid. Then 12 grams of sodium sulfide dissolved in 50 ml. of water was added to form the bright orange vinylic pigment. The resulting vinylic pigment was filtered and the filter cake redispersed in 500 ml. of water and filtered. This was repeated again. The orange vinylic pigment pulp can be used as is or flushed or dried and in any of these forms with or without combination with other pigments. When forming such a vinylic pigment variations in formulation of the pigmentation ingredients can be made to influence the shade of such pigments.

Example 76

In this example a vinylic filler is pigmented with a Prussian blue type compound.

In the high speed blendor was added 100 ml. of the vinylic filler latex prepared as heretofore described and this latex was agitated. Then a solution of 13 grams of ferrous sulfate dissolved in 100 ml. of water was added followed by a solution of 10 grams of potassium ferrocyanide dissolved in 100 ml. of water. As agitation continued the greyish color mix began to turn green and then 7.5 ml. of concentrated nitric acid dissolved in 20 ml. of water was added and the color began to change to blue. After 30 minutes of agitation the deep Prussian blue vinylic pigment had formed which was diluted with water and filtered. The filter cake was reslurried in 500 ml. of water to which 2 ml. of concentrated nitric acid was added and filtered and again the filter cake was dispersed in 500 ml. of water and filtered. The resulting filter cake was ready for uses such as compounding with a suitable water paint base; flushing with a vehicle; or removing the moisture from such filter cake to form the vinylic pigment.

It is understood that variations can be made in the above recipe to produce the desired shades including the addition of tin salts to produce the reddish shades.

Example 77

In this example a vinylic filler is pigmented with a titanium white.

In the high speed blendor was added 100 ml. of the vinylic filler latex prepared as heretofore described and to this latex while being well agitated was added slowly 20 ml. of titanium tetrachloride. The white vinylic pigment which resulted was filtered and then to remove the free hydrochloric acid the wet pigment cake was reslurried in 500 ml. of water and filtered. The resulting filter cake was ready for uses such as compounding with a suitable water paint base; flushing with a vehicle; or removing the moisture from such filter cake to form the vinylic pigment.

Further the white titanium vinylic pigment filter cake may be combined with dyestuffs. Likewise other white pigments may be precipitated in the presence of a vinylic filler to form a white vinylic pigment and these also may be colored by organic or inorganic pigmentation.

Thus, this vinylic titanium white pigment can be used with titanium dioxide pigments such as Ti-Pure-R (Du Pont) or can be used with other inorganic or organic pigments. Under the section on application is a list of the inorganic and organic pigments which are typical of those that can be used with vinylic type fillers as exemplified by this example and the other examples of this invention.

Example 78

This example is a vinylic titanium white pigment further pigmented with the dyestuff Acid Green (Ciba).

The vinylic titanium white pigment filter cake from Example 77 was placed in the high speed blendor and 200 ml. of water was added plus 10 ml. of 10% sodium hydroxide solution. This mixture was agitated for 5 minutes, then 7 grams of Acid Green (Ciba) dissolved in 100 ml. of 95° C. water was added and agitation was continued for 5 minutes followed by the addition of a solution of 15 grams of barium chloride dissolved in 150 ml. of water. Agitation was continued for 15 minutes and the green vinylic pigment was filtered and the filter cake washed. This product can be used as is, flushed, or dried.

In contrast Example 7 illustrates a vinylic pigment inorganic pigment combination which was prepared from an acidic vinylic filler and the dyestuff Acid Green (Ciba) as the color component and the inorganic pigment added thereto was a titanium dioxide pigment Ti-Pure-R (Du Pont). Also see Example 17A.

Example 79

Chromate greens are prepared by coprecipitating a lead chromate in the presence of a Prussian blue or by physically mixing the chrome yellow and iron blue pigment. In the following example I show how a vinylic chrome yellow pigment and a vinylic iron blue pigment can be combined.

Wet vinylic chrome yellow pigment pulp 80 grams dry solids basis from Example 74 heretofore is placed in the high speed blendor and 200 ml. of water are added, then wet vinylic iron blue pigment pulp is added to the extent of 20 grams dry solids basis from Example 76 heretofore and the resulting mix well agitated and filtered and dried. The resulting pigment combination is referred to as vinylic chromate green pigment mixture. The shade of green can be adjusted by varying the ratio of the components.

When vinylic chrome yellow pigment is being used then all or any part of the vinylic iron blue pigment can be substituted by regular iron blue pigment water paste (not, of course, prepared with a vinylic filler) or by the dry iron blue pigment powder. Conversely, the vinylic chrome yellow pigment may be substituted in part or totally by regular chrome yellow pigment wet press cake or the dry pigment powder (not, of course, prepared with vinylic filler) with the blue component being the vinylic iron blue pigment. Thus by these various combinations chromate greens with various appearances can be produced because the non-vinylic chrome yellow and iron blue pigments have an opacity and covering power while the vinylic chrome yellows and iron blue pigments have transparency and low covering power. This example and its variations should teach one skilled in the art to appreciate the numerous combinations which can be made with vinylic pigments and organic and inorganic pigments both in their dry pigment and water dispersed forms.

Example 80

To the high speed blendor was added 50 ml. of graft formed vinylic filler prepared as heretofore described, further was added 100 ml. of water, 10 grams of silver nitrate dissolved in 100 ml. of water and 15 ml. of 28% aqueous ammonia. The combination upon agitation yielded a thick white mix to which was given 15 ml. of 36% aqueous formaldehyde at which time the color started to change to a brown. The steam tube was placed in the blendor and the temperature raised to the boiling point and agitated for 10 minutes during which time the color became a deep brown. The mix was filtered and the filtrate was free of silver ions, whereupon the filter cake was redispersed in 500 ml. of isopropyl alcohol and again filtered. The resulting filter cake was dried yielding a brown vinylic pigment which consisted of vinylic filler particles coated with metallic silver.

This experiment was repeated and in place of the 10 grams of silver nitrate 1 gram of palladium chloride was used resulting first in a white pigment mix which was reduced with the formaldehyde to a grey mix which was eventually dried to the palladium pigment powder.

The examples in this section should illustrate that water insoluble metal salts can be formed in the presence of vinylic type pigments and further that certain water soluble metal salts can be reduced to the free metal, thus yielding colloidal metals deposited on a colloidal organic carrier. Such metal coated vinylic fillers have unique electric properties, can be used as decorative coatings and have many other applications.

In the examples of part XIII there is first formed the heavy metal salt of the vinylic filler as for example the lead, cadmium, iron and silver salts. These salts are useful in themselves. For example the cobalt, aluminum, barium, copper, manganese, nickel, strontium, etc. salts of vinylic fillers can be used in ceramic coloring, especially with the chromium salts of the vinylpyridine based vinylic fillers.

The vinylic filler makes an effective catalyst carrier. Further, metals such as silver on the vinylic filler have certain medical applications such as in tropical dressings.

Thus the wide application of inorganic coated vinylic type fillers, which I have referred to as the inorganic pigmented type, can be appreciated by one skilled in the art whether such inorganic coating is a free metal or a precipitated oxide or hydroxide of such metals, or the insoluble metal salt of the vinylic filler, or an insoluble salt of the metal deposited on the surface of the vinylic type filler.

Vinylic fillers and graft vinylic fillers referred to as vinylic type fillers and pigments therefrom can be converted to the dry filler or pigment and still be capable of redispersion in solvent combinations, in water, or in high polymers providing certain precautions are taken.

The vinylic type fillers and pigments are redispersable in certain polar solvents such as dimethylformamide and non-polar solvents with small additions of polar solvents such as toluene and isobutyl alcohol providing the vinylic type fillers or pigments are dried down at moderate temperatures and providing the vinylic particles are not surfaced with reactive constituents such as phenol-formaldehyde, urea-formaldehyde or the melamine resins.

The vinylic type fillers and pigments are redispersable in water providing a water soluble polymer such as polyacrylic acid ammonium salt, or polyvinylpyridine hydrochloride, or the ammonium salt of the copolymer of styrene and maleic anhydride described as the emulsifier for the examples under subheading XIII heretofore, and providing a water solution of such polymer is added in sufficient quantity to the vinylic type filler and pigment latices to prevent the vinylic type filler and pigment particles from agglomerating on drying. Such dried products can be redispersed in water if the necessary alkali is added. It is again understood that the vinylic particles must not be surfaced with reactive materials such as heat setting resins which will on drying cross-link to insoluble masses.

The vinylic type fillers and pigments are redispersible in high polymers providing to the vinylic latices are added a latex or a dispersion or a dispersible high polymeric material which is soluble in the high polymer in which the vinylic type filler or pigment is to be dispersed. Further it is desirable that the soluble high polymer chosen has some affinity for the vinylic type filler or pigment being used. Acidic vinylic filler latices can be mixed with a latex of an ammonium salt of a terpolymer of styrene-butadiene-methacrylic acid (ratio 81 to 15 to 4) and if 1 part of the dispersing water soluble polymer latex is used with 2 parts of such vinylic filler or pigment and the mixture dried to a powder then this polymer combination will mill into polymers such as GR–S. It is again understood that the vinylic particles must not have heat setting resins on their surface, otherwise dispersion cannot be accomplished.

Thus, vinylic type fillers and pigments can be handled so that these new materials are colloidally dispersible in certain solvents and solvent combinations, in water and in high polymers. This colloidal dispersion is important where one desires the full effect of the reinforcing properties of these vinylic type fillers and pigments.

Where the vinylic pigments are being used for effects of coloration only then the dry products of this invention need no special handling or the addition of soluble polymeric material.

Of course the vinylic pigment wet pulps of this invention can directly be incorporated in vehicles or even in polymeric material while retaining the colloidal dispersion.

APPLICATION

Vinylic filler pigment latices can be produced which are entirely stable as latices, and can be used in latex form as protective coatings or constituents thereof, or as coloring material with reinforcing properties for blending with other elastic and plastic materials. It should be noted that vinylic filler pigments prepared from a mixture of latices of vinylic fillers containing acid groups on the one hand and basic groups on the other, will tolerate the presence of greater amounts of salt or other electrolytes usually present in commercially procured dyestuffs, without the pigment being coagulated thereby.

The fixed vinylic filler pigment latices when coagulated are filterable and washable, thus giving a filter cake which can either be dried or flushed with vehicles to produce flush colors of a new type.

By spraying vinylic pigment latices then, solid vinylic pigments can be produced that can be used as reinforcing pigments in various elastic and plastic materials and thus provide for the rubber, plastic, and decorative coating industry, a new and valuable raw material having both reinforcing and pigmentation properties.

Since the vinylic filler pigments are insoluble and may be either basic, acid, amphoteric, or neutral; they may be adapted for use with any type of film forming material, or with blends thereof; and with any vehicles or solvents; and the film-former may be modified with catalyst, drier, inhibitor, plasticizer and the like, in any manner usual for such materials.

The vinylic filler pigments, unless precipitated or complexed with a heavy metal salt, are of colloidal particle size and have a refractive index equal or close to the refractive index of organic film forming vehicles, therefore films containing such vinylic filler pigments can be very transparent. Thus, organic colors like the azoic and vat colors when converted into vinylic filler pigments form transparent colors. Films containing these vinylic filler pigments may be used as a depth coating over an underlying coating containing pigments prepared in conventional manners or pigments with good covering or hiding power, which is especially effective when metallic flakes are used as bronze or aluminum flake pigments in the undercoat.

Plastic such as styrene, vinyl chloride, the acrylates, polyethylene etc., are effectively colored, hardened and reinforced by vinylic pigments without detracting from their otherwise excellent characteristics.

The film forming ingredients, when polymeric in nature, may be grafted on the vinylic filler particles in the latex suspension thereof, and vinylic filler pigments when combined in this way or by mixing with flexible film forms can be used for coatings on textiles, paper, leather and other flexible coatings.

In my U.S. application, Ser. No. 538,728 filed Oct. 5, 1955, and now abandoned, entitled, "Graft Vinylic Fillers and Their Uses," I showed that vinylic fillers can be grafted with water soluble resins capable of being converted to water insoluble resins, such as the resorcinol-formaldehyde type condensation product and the urea-formaldehyde type condensation product. It is to be noted that the resin condensation of the types referred to can either be made before or after the coloration of the vinylic filler to form vinylic pigment.

A urea or melamine resin can be made with basic or acid catalyst, or both sequentially, depending on whether a cationic or anionic resin is desired. The vinylic filler can be made with cationic or anionic emulsifier and in any desired pH range. Thus the vinylic filler latex with cationic or anionic surface charge can be combined with urea and formaldehyde or combined with a pre-prepared urea-formaldehyde or similar type resin and then the water soluble dye can be added and adsorbed by the vinylic filler. In a similar manner, the vinylic filler before or after conversion to a pigment by dyestuff addition may be combined with a water soluble resin (capable of being converted into an insoluble state either by heat or chemical means). A portion of the aldehyde resin ingredients may be applied to the vinylic filler pigment and condensed and heat converted to a resin grafted on the vinylic filler pigment particles, and the remainder of the aldehyde resin ingredients may be added and condensed, with heat conversion, so that they remain to serve as a bonding material between the vinylic filler pigment particles and textile, paper, leather or other material being coated or color printed or otherwise treated with this product.

Textiles, paper, leather or the like can be printed in the conventional manner and depending on the condensation resin selected cured in the temperature range 250–400° F. The temperature selected will depend on the type of accelerator used with the adhesive resin. I prefer to use ammonia or relative low boiling amine like triethanolamine and the like which will evaporate at the curing temperatures and thus permit the melamine-formaldehyde, phenol-formaldehyde, urea-formaldehyde or like resin to cure on the acid side.

Because of the colloidal size of the vinylic filler pigments they are ideally suited to forming printing pastes of the type described. Such vinylic filler printing pastes will bond excellently to the cloth, paper, leather or plastics being printed, and are highly advantageous for printing on transparent films, such as cellophane.

Where it is desirable to provide a printing paste free of emulsifier I have formed the pigment from latices prepared by polymerization without emulsifier or by the use of an anionic or cationic polymeric emulsifier (see Example 22A, part IV; Examples 74–79, part XIII).

When the concentration of the vinylic filler latex is high it is often desirable to add to the latex a polyglycol or polyglycol ether as a stabilizer, either before or after conversion to a vinylic filler pigment latex. For instance, a water insoluble polypropylene glycol 1025, Carbide and Carbon Chemical Corporation, has been found very useful as a stabilizer. This permits the dye to be applied to the vinylic filler without coagulation, even when commercial dyestuffs containing electrolytes are used.

The printing paste can be brought to the desired viscosity by using a thickening agent such as a few percent of sodium carboxymethyl cellulose, or other suitable thickening agents commonly employed for such purposes.

When water pastes of aluminum and copper flake pigments are added to the water paste vinylic filler pigments, interesting effects can be produced especially for coatings on metals or organic materials and for general decorative effects.

The advantages of the vinylic filler pigment compounds and compositions of the present invention over those of the prior art lie in their greatly improved fineness of particle size and their homogeneity.

Vinylic pigments because of their colloidal particle size and refractive index have low covering power. However, this is compensated for by depth of color and if coverage is desired, then vinylic fillers can be combined with organic and inorganic pigments which can provide such coverage; or an undercoat can provide such coverage.

Pigment combinations can be obtained by combining vinylic or graft vinylic pigments with natural or synthetic mineral pigments and earth colors herein designated "inorganic pigments," as for example, the white inorganic pigments such as zinc sulfide, barium sulfate, lithopone, white lead, Fuller's earth, asbestos powder, kaolin clays, zinc oxide, titanium dioxide and its combination with barium and calcium sulfate, etc.; the yellow inorganic pigments such as cadmium yellows, zinc chromates, mixed zinc, cadmium, and barium pigments, yellow iron oxides and ochers, etc.; the orange inorganc pigments such as litharge, cadmium oranges, chrome oranges, orange menniges, etc.; the red inorganic pigments such as cadmium reds, chrome reds, red menniges, red lead, molybdate reds, red iron oxide and ochers, etc.; the green inorganic pigments such as chrome greens, zinc greens, Schweinfurt green, green chrome oxides, cobalt greens, the green earth pigments, etc.; the blue inorganic pigments, such as ultramarines, iron blues (Milori, Pariser and Berliner blues), the cobalt blues, etc.; the brown inorganic pigments such as umbras, ochers, brown earth pigments.

Under the "inorganic pigments" which can supply covering power and can be used in connection with vinylic and graft vinylic pigments I include the metal powder and flake pigments from, for example, aluminum, copper, bronze, gold, etc.

Organic pigments or lakes can be used in conjunction with vinylic pigments and the following list, while by no means complete, is illustrative of these organic pigments: ortho-nitraniline red, paranitraniline reds, dinitraniline red, toluidine reds, lithol red, lithol rubine lake, pigments scarlet lake, scarlet 2R lake, alizarine lake, Bordeaux lakes, lake red C, madder lake R, rhodamine lakes, eosine lakes, Persian orange lake, methyl violet lake, fuchsin lake, patent blue lake, peacock blue lakes and acid green pigments.

When the organic pigment and vinylic pigment are of the same identical color, or of colors which blend well, or of complementary colors then combinations can be made which are pleasing to the eye. Further these organic pigments may be combined with inorganic pigments and such combinations combined with one or more vinylic pigments to obtain the desired color effect.

When decorative and protective coatings are desired special effects can be obtained from certain combinations, for example, an undercoat of paint containing an inorganic pigment with or without vinylic pigments can be covered with an outercoat containing only vinylic pigments thus producing an effect of depth of color.

When pastel shades are desired then the white inorganic pigment usually equals or exceeds the vinylic pigment and when deeper shades are desired the vinylic pigment is usually in excess. In the case of colored inorganic pigments the ratio of such pigment is determined usually by the covering power desired unless special color effects are desired.

Vinylic pigments and inorganic pigments and other organic pigments may be mixed and ground dry; however, I prefer to add to the vinylic pigment latices or filter cake therefrom, either the dry inorganic or organic pigment or mixtures of such pigments; or water slurries of such pigments; or the press cake when organic or inorganic pigments are made by a wet precipitation process and filtered. Such organic or inorganic pigment combinations with the vinylic pigment should be thoroughly mixed and used in such form as, for example, in water base paints and coatings; or transferred to an organic medium as in preparing flush colors; or dried and used as dry pigment.

Such combinations of vinylic pigments and inorganic pigments can be used to color natural and synthetic elastic and plastic materials in their application as fibers, foils, coatings and masses.

It is understood that the term vinylic pigments used heretofore means the combination of a dyestuff and a vinylic type filler, the latter being either a vinylic filler or a graft vinylic filler, and such vinylic pigments can be used to color or to color and reinforce natural or modified natural or synthetic elastomers and plastomers.

Natural and modified natural elastomers are exemplified by natural rubber and modification thereof such as chlorinated and hydrochlorinated natural rubber, and such can be colored or colored and reinforced by vinylic type pigments.

Synthetic elastomers such as the hydrocarbon diene type and vinyl copolymers thereof such as polybutadiene, polyisoprene and polyhexadiene and butadiene-isoprene-vinyl copolymers in which the vinyl is styrene, acrylonitrile, acrylate esters, vinylpyridine, acrylic acid, etc.; polypolar dienes such as polychloroprene (neoprene types); polyisobutylene-diene copolymers (butyl rubber types) and other elastomers from polymerizable ethylene linkages and elastomers from polycondensation products such as glycols and polyglycols, amides, polycarboxylic acid and diisocyanates, etc.; for these synthetic elastomers can be colored or colored and reinforced with vinylic type pigments.

Natural and modified natural plastomers such as starch and starch modifications such as allyl starch; cellulose acetate, saponified cellulose acetate, cellulose acetate butyrate, cellulose acetate propionate, nitrocellulose, cellulose ether, cellulose formate, methyl and ethyl cellulose, Viscose rayon, acetate rayon, cuprammonium rayon, celluloid and the like natural and modified natural plastomers can be colored or colored and reinforced with vinylic type pigments.

Synthetic plastomers such as the hydrocarbon polymers, polyethylene, hydrogenated polybutadiene and butadiene copolymers, polyisobutylene and isobutylene copolymers such as isobutylene-styrene copolymer; the vinyl copolymers such as polystyrene, polyacrylates, polyacrylonitrile, polyvinylchloride, vinylchloride-vinyl acetate copolymers, vinylchloride-vinylidene chloride copolymers, polyvinylidene chloride, polyvinyl acetate, polyvinylbutyral, polyvinyl formal, polyvinyl alcohol, polyvinyl butyraldehydracetal, polyvinyl formaldehydacetal, polyvinyl acetaldehydracetal, polyamides, polyurethanes, terlene and the like synthetic plastomers can be colored or colored and reinforced with vinylic type pigments.

Further, the vinylic type pigments can be used in decorative and protective coatings such as with drying oils, maleic acid modified drying oil, styrinated oils, alkyds, and as we have learned with phenoplasts and aminoplastics.

When the vinylic type pigments are properly chosen such as from suitable azoic, vat or sulfur dyes then such pigments can be used in vulcanizates with the elastomers heretofore cited.

By the research summarized herein it has been shown:

(a) That vinylic type filler latices, that is vinylic filler latices and graft vinylic filler latices, or reconstituted water slurries of vinylic or graft vinylic fillers, can be combined with water soluble dyestuffs, the leuco form of dyestuffs, the leuco esters of dyestuffs or dyestuff components which are to be converted to dyestuffs and that such combinations of dyestuffs and vinylic type fillers form vinylic filler pigments, i.e., vinylic pigments; that the dyestuff is distributed over the surface of the colloidal insoluble vinylic filler particles, thus fully utilizing the dyestuffs ability to impart color; that the vinylic type fillers, after conversion to vinylic pigments, are still effective reinforcing materials when dispersed in elastic or plastic materials; and that the vinylic pigments may be dried for uses in which dry pigments are desired.

(b) That dyestuffs can be fixed to the vinylic filler in such a manner that the dyestuff is not extractable by water from the vinylic pigment; and that all types of dyestuffs can be fixed to vinylic fillers, although the mechanisms are varied. For instance, such fixation may be: the effect of utilizing adsorption as in the case where dyestuff capable of directly dyeing cellulose acetate are fixed on a selected graft vinylic filler by adsorption; the ionic bonding effect which is utilized to fix an acid or basic dyestuff to a basic or acidic vinylic type filler; the coupling effect which is used to complex both dyestuff and vinylic type filler by, for instance, metallic salt complexing; the insolubilizing of dyestuffs on vinylic type fillers and can be accomplished, for instance, by the formation of heavy metal salts of such dyestuffs and/or the vinylic type filler. This is exemplified by the fact that when lithol red is formed as the barium salt the pigment has covering or hiding properties which is because of the size and shape of the pigment crystals. However, when lithol red as the barium salt is formed in the presence of the vinylic type fillers, then the resulting vinylic pigment has little or no pigment covering power, but because of its colloidal size such vinylic pigment has, however, depth of color and transparency which is most effective when used in top cover coating over the coating which provides the covering power. Further, the research has shown that dyestuffs may be fixed to vinylic type fillers by chemical bonding as, for example, a vinylic type filler having surface aldehyde groups thereon can combine with basic dyestuffs or direct and development dyestuffs having an active amino group thereon, which is capable of reacting with the aldehyde group on the vinylic filler. For example, Bismarck Brown is chemically bound to such aldehyde vinylic type filler forming very stable vinylic pigments (see (e) hereafter).

(c) That the dyestuffs having acidic groups, in the presence of vinylic fillers, are capable of being precipitated by soluble heavy metal salt to form an insoluble dyestuff salt of such metal ion on the surfaces of the colloidal sized vinylic filler particles. In a like manner, I have shown that, in the presence of vinylic filler dyestuffs with basic groups such as the amino or substituted amino group can complex with heavy metal salts capable of forming such complex as, for example, tungsten and molybdenum and their salts, and produce colloidal sized vinylic pigments.

(d) That dyestuffs capable of being fixed by mordant techniques to various fibers and fabrics can by similar methods be fixed to vinylic type fillers to form vinylic pigments.

(e) That it has been shown that any dyestuff with a reactive amino group can be fixed on a vinylic type filler providing such filler has reactive aldehyde groups on its surface.

(f) That dyestuffs capable of reduction to the leuco form can in the presence of vinylic type fillers be oxidized to form color fast vinylic pigments.

(g) That vinylic pigments result when vinylic type fillers are pigmented by forming inorganic pigments in the presence of such fillers.

(h) That vinylic pigments can be formed by pigmenting a vinylic type filler together with a high polymeric material, the alkali salts of which are water soluble.

(i) That a vinylic pigment can be combined with a high polymeric material, the alkali salts of which are water soluble.

(j) That vinylic type fillers can be colored or pigmented with both organic and inorganic coloring and/or pigmenting materials to form vinylic pigments.

(k) That when covering or hiding power is desired, vinylic pigments can be combined with inorganic and organic pigments possessing covering power.

(l) That vinylic pigments can be employed with plastic and elastic materials for their color and decorative effects, while retaining the exceptional reinforcing properties inherent in the vinylic type filler and thus also in the vinylic pigment.

(m) That vinylic pigments can be combined with elastic or plastic materials and other surfaces, especially natural and synthetic fibers and their woven products by combining, adhering or using with aldehyde condensation products especially formaldehyde condensation products prepared with a reactive phenolic, urea, melamine, etc. type derivative. This is especially important in the color printing of fibers, paper and the like.

Those skilled in the physical chemistry of dyeing will appreciate from the present disclosure that in the preparing of vinylic pigments many and varied dyestuffs and dyestuff components can be used with a wide variety of vinylic type fillers which can be prepared with numerous reactive and polar groups thereon. An excellent recent book by Thomas Vickerstaff, entitled, "The Physical Chemistry of Dyeing," published for Imperial Chemical Industries, Ltd. in 1954 by Oliver and Boyd, London, England, compiles much of the background in the physical chemistry of dyeing useful in applying the present invention.

In this book are well illustrated the complementary groups which are useful to fix various classes of dyestuffs to natural and synthetic fibers and I have shown that reactive groups and polar groups similar to those on such natural and synthetic fibers can be built into the vinylic type fillers and then such dyestuff can be fixed to such fillers forming the vinylic pigments. A great variety of colors and fixing methods for different fibers are found in the book, entitled, "The Principles and Practice of Textile Printing," by Edmund Knecht and James Best Fothergill, published in 1952 by Chas. Griffin & Co., Ltd., London, England, and again the teachings of this invention will enable such methods to be applied to the formation of vinylic pigments. For example, a basic vinyl filler can be dyed by the techniques used to dye wool yarns as described in this text. Also the printing paste formulae given in this text are useful in formulating vinylic pigments into printing pastes. The 1953 Technical Manual and Year Book of the American Association of Textile Chemists and Colorists, vol. XXIX, published by Howes Publishing Co., Inc., New York, N.Y., gives a list of the American-made dyes which can be used in accordance with the present invention to prepare vinylic pigments even including the spirit and oil soluble dyes which, while applicable in an appropriate solvent, have no special advantages in forming vinylic pigments.

In selecting a heavy metal to precipitate dyestuff having water solubilizing groups reference may be had to Gustav Schultz's "Farbstofftabellen," published in 1931 by Akademische Vertagsgesellschaft in Leipzig, Germany. Under each of the older dyestuffs listed in this book are given the application of the dyestuffs and under the subheading "Farblacke" is often given the preferable heavy metal salts which afford best precipitation while retaining color and brightness and I have found such heavy metal salts can effectively be used to precipitate the dyestuff on vinylic type fillers to form vinylic pigments.

While the examples given heretofor are not to be considered restrictive, I believe they are extensive enough together with the art cited to teach the broad application of this invention to those skilled in the polymerization art, the protective and decorative coating art, the rubber art, the plastic art and the dyestuff and pigment art.

I claim:

1. A process for producing a colloidal sized pigment which process consists essentially in coloring, in aqueous dispersion, colloidal sized vinylic filler particles as hereinafter defined, by precipitating onto said particles, from solution in the aqueous phase of said dispersion, at least one coloring component as hereinafter defined; said vinylic filler material being made up essentially of polymer particles in the colloidal size range of about 5 millimicrons to about 0.5 micron average diameter; said particles being three-dimensionally cross-linked so that each particle is non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid; said coloring component comprising a metal combined in the aqueous phase in the form of a soluble metal compound, and being precipitated onto the colloidal sized vinylic filler particles in an insoluble form selected from the class consisting of free metal, metal oxides and insoluble metal compounds, and said coloring component being of such size that the resulting individual colored particles are still in the colloidal size range of about 5 millimicrons to about 0.5 micron average diameter.

2. A colloidal sized vinylic pigment comprising vinylic filler material as herein defined having on the surfaces thereof color components as herein defined; said vinylic filler material being made up essentially of polymer particles in the colloidal size range of about 5 millimicrons to about 0.5 micron average diameter; said particles being three-dimensionally cross-linked so that each particle is non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid; and said color components consisting essentially of insoluble inorganic material selected from the class consisting of the free metals, metal oxides and insoluble metal compounds.

3. A colloidal sized vinylic pigment comprising vinylic filler material as herein defined having on the surfaces thereof color components as herein defined; said vinylic filler material being made up essentially of polymer particles in the colloidal size range of about 5 millimicrons to about 0.5 micron average diameter; said particles being three-dimensionally cross-linked so that each particle is non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid; and said color components consisting essentially of water insoluble dyestuff which has been precipitated onto the surfaces of the colloidal sized vinylic filler particles from an aqueous solution of said dyestuff with the aid of a precipitant which converts such dyestuff into a water insoluble compound.

4. A colloidal sized vinylic pigment comprising vinylic filler material as herein defined having on the surfaces thereof color components as herein defined; said vinylic filler material being made up essentially of polymer particles in the colloidal size range of about 5 millimicrons to about 0.5 micron average diameter; said particles being three-dimensionally cross-linked so that each particle is non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid; and said color components consisting essentially of water insoluble coloring material chemically bonded to said vinylic filler particles.

5. A colloidal sized vinylic pigment comprising vinylic filler material as herein defined having on the surfaces thereof color components as herein defined; said vinylic filler material being made up essentially of polymer particles in the colloidal size range of about 5 millimicrons to about 0.5 micron average diameter; said particles being three-dimensionally cross-linked so that each particle is non-soluble in any solvent that does not break down its primary chain structure; said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them non-soluble as aforesaid; and said color components consisting essentially of dyestuff chemically bonded to said vinylic filler particles.

References Cited

UNITED STATES PATENTS 3,190,850   6/1965   Burke _____ 260—38

ALLAN LIEBERMAN, *Primary Examiner.*

U.S. Cl. X.R.

260—41.5; 424—78